US006971044B2

(12) United States Patent
Geng et al.

(10) Patent No.: US 6,971,044 B2
(45) Date of Patent: Nov. 29, 2005

(54) SERVICE CLUSTERS AND METHOD IN A PROCESSING SYSTEM WITH FAILOVER CAPABILITY

(75) Inventors: Scott Geng, Westboro, MA (US); Pete Manca, Sterling, MA (US); Paul Curtis, Sudbury, MA (US); Ewan Milne, Stow, MA (US); Max Smith, Natick, MA (US); Alan Greenspan, Northboro, MA (US); Edward Duffy, Arlington, MA (US); Peter Schulter, Hampstead, NH (US)

(73) Assignee: Egenera, Inc., Marlborough, MA (US)

( * ) Notice: Subject to any disclaimer, the term of this patent is extended or adjusted under 35 U.S.C. 154(b) by 422 days.

(21) Appl. No.: 10/038,355

(22) Filed: Jan. 4, 2002

(65) Prior Publication Data

US 2002/0156613 A1    Oct. 24, 2002

Related U.S. Application Data

(60) Provisional application No. 60/285,296, filed on Apr. 20, 2001.

(51) Int. Cl.[7] ............................................. G06F 11/00
(52) U.S. Cl. ........................................ 714/11; 709/226
(58) Field of Search ...................... 714/11, 4, 13, 18, 714/43, 56, 15, 9; 709/203, 220, 221, 219, 709/222, 245

(56) References Cited

U.S. PATENT DOCUMENTS 5,197,148 A * 3/1993 Blount et al. ................. 714/5

| 5,208,811 A | 5/1993 | Kashio et al. |
| 5,473,599 A | 12/1995 | Li et al. |
| 5,535,338 A | 7/1996 | Krause et al. |
| 5,590,285 A | 12/1996 | Krause et al. |
| 5,818,842 A | 10/1998 | Burwell et al. |
| 5,825,772 A | 10/1998 | Dobbins et al. |
| 5,835,725 A | 11/1998 | Chiang et al. |
| 5,970,066 A | 10/1999 | Lowry et al. |

(Continued)

*Primary Examiner*—Nadeem Iqbal
(74) *Attorney, Agent, or Firm*—Wilmer Cutler Pickering Hale and Dorr LLP

(57) ABSTRACT

A platform for and method of computer processing to support processor failover are disclosed. A plurality of computer processors are connected to an internal communication network. A virtual local area communication network over the internal network is defined and established. Each computer processor in the virtual local area communication network has a corresponding virtual MAC address and the virtual local area network provides communication among a set of computer processors but excludes the processors from the plurality not in the defined set. A virtual storage space is defined and established with a defined correspondence to the address space of the storage network. In response to a failure by a computer processor, a computer processor from the plurality is allocated to replace the failed processor. The MAC address of the failed processor is assigned to the processor that replaces the failed processor. The virtual storage space and defined correspondence of the failed processor is assigned to the processor that replaces the failed processor. The virtual local area network is reestablished to include the processor that replaces the failed processor and to exclude the failed processor.

6 Claims, 14 Drawing Sheets

U.S. PATENT DOCUMENTS

| | | |
|---|---|---|
| 6,003,137 A | 12/1999 | Kawasaki |
| 6,091,732 A | 7/2000 | Alexander, Jr. et al. |
| 6,178,171 B1 | 1/2001 | Alexander, Jr. et al. |
| 6,195,705 B1 | 2/2001 | Leung |
| 6,253,230 B1 * | 6/2001 | Couland et al. ............ 709/203 |
| 6,684,343 B1 * | 1/2004 | Bouchier et al. ............... 714/4 |
| 6,728,780 B1 * | 4/2004 | Hebert ....................... 709/239 |
| 6,763,479 B1 * | 7/2004 | Hebert ........................... 714/4 |
| 6,799,202 B1 * | 9/2004 | Hankinson et al. ......... 709/219 |
| 2002/0138649 A1 * | 9/2002 | Cartmell et al. ............ 709/245 |

* cited by examiner

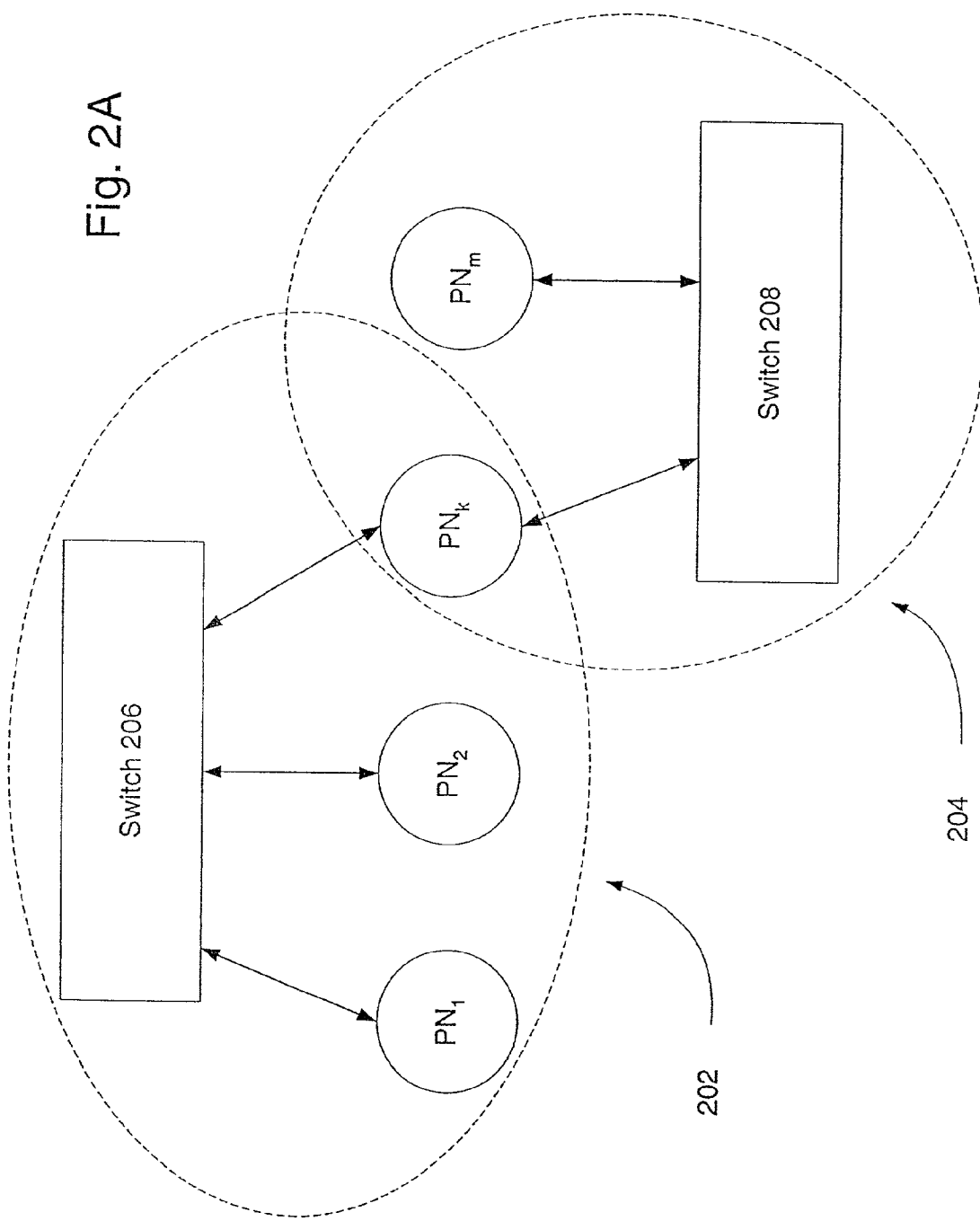

SERVICE CLUSTERS AND METHOD IN A PROCESSING SYSTEM WITH FAILOVER CAPABILITY

CROSS-REFERENCE TO RELATED APPLICATIONS

This application claims priority to U.S. provisional application Ser. No. 60/285,296, filed on Apr. 20, 2001, which is hereby incorporated by reference.

BACKGROUND

1. Field of the Invention

The present invention relates to computing systems for enterprises and application service providers and, more specifically, to processing systems having virtualized communication networks and storage for quick deployment and reconfiguration.

2. Discussion of Related Art

In current enterprise computing and application service provider environments, personnel from multiple information technology (IT) functions (electrical, networking, etc.) must participate to deploy processing and networking resources. Consequently, because of scheduling and other difficulties in coordinating activities from multiple departments, it can take weeks or months to deploy a new computer server. This lengthy, manual process increases both human and equipment costs, and delays the launch of applications.

Moreover, because it is difficult to anticipate how much processing power applications will require, managers typically over-provision the amount of computational power. As a result, data-center computing resources often go unutilized or under-utilized.

If more processing power is eventually needed than originally provisioned, the various IT functions will again need to coordinate activities to deploy more or improved servers, connect them to the communication and storage networks and so forth. This task gets increasingly difficult as the systems become larger.

Deployment is also problematic. For example, when deploying 24 conventional servers, more than 100 discrete connections may be required to configure the overall system. Managing these cables is an ongoing challenge, and each represents a failure point. Attempting to mitigate the risk of failure by adding redundancy can double the cabling, exacerbating the problem while increasing complexity and costs.

Provisioning for high availability with today's technology is a difficult and costly proposition. Generally, a failover server must be deployed for every primary server. In addition, complex management software and professional services are usually required.

Generally, it is not possible to adjust the processing power or upgrade the CPUs on a legacy server. Instead, scaling processor capacity and/or migrating to a vendor's next-generation architecture often requires a "forklift upgrade," meaning more hardware/software systems are added, needing new connections and the like.

Consequently, there is a need for a system and method of providing a platform for enterprise and ASP computing that addresses the above shortcomings.

SUMMARY

The present invention features a platform and method for computer processing in which virtual processing area networks may be configured and deployed.

Under one aspect of the invention, a platform for and method of computer processing are provided to support processor failover. A plurality of computer processors are connected to an internal communication network. A virtual local area communication network over the internal network is defined and established. Each computer processor in the virtual local area communication network has a corresponding virtual MAC address and the virtual local area network provides communication among a set of computer processors but excludes the processors from the plurality not in the defined set. A virtual storage space is defined and established with a defined correspondence to the address space of the storage network. In response to a failure by a computer processor, a computer processor from the plurality is allocated to replace the failed processor. The MAC address of the failed processor is assigned to the processor that replaces the failed processor. The virtual storage space and defined correspondence of the failed processor is assigned to the processor that replaces the failed processor. The virtual local area network is reestablished to include the processor that replaces the failed processor and to exclude the failed processor.

Under another aspect of the invention, a system for and method of providing a service addressed by an IP address are provided. At least two computer processor each include logic to provide the service. Cluster logic receives request messages for the service. The messages have the IP address. The cluster logic distributes the requests to one of the at least two computer processors having logic to provide the service.

BRIEF DESCRIPTION OF THE DRAWINGS

In the Drawing,

FIGS. 2A–C are diagrams illustrating the communication links established according to one embodiment of the invention;

DETAILED DESCRIPTION

Preferred embodiments of the invention provide a processing platform from which virtual systems may be deployed through configuration commands. The platform provides a large pool of processors from which a subset may be selected and configured through software commands to form a virtualized network of computers ("processing area network" or "processor clusters") that may be deployed to serve a given set of applications or customer. The virtualized processing area network (PAN) may then be used to execute customer specific applications, such as web-based server applications. The virtualization may include virtualization of local area networks (LANs) or the virtualization of I/O storage. By providing such a platform, processing resources may be deployed rapidly and easily through software via configuration commands, e.g., from an administrator, rather than through physically providing servers, cabling network and storage connections, providing power to each server and so forth.

Overview of the Platform and Its Behavior

Figure 1:
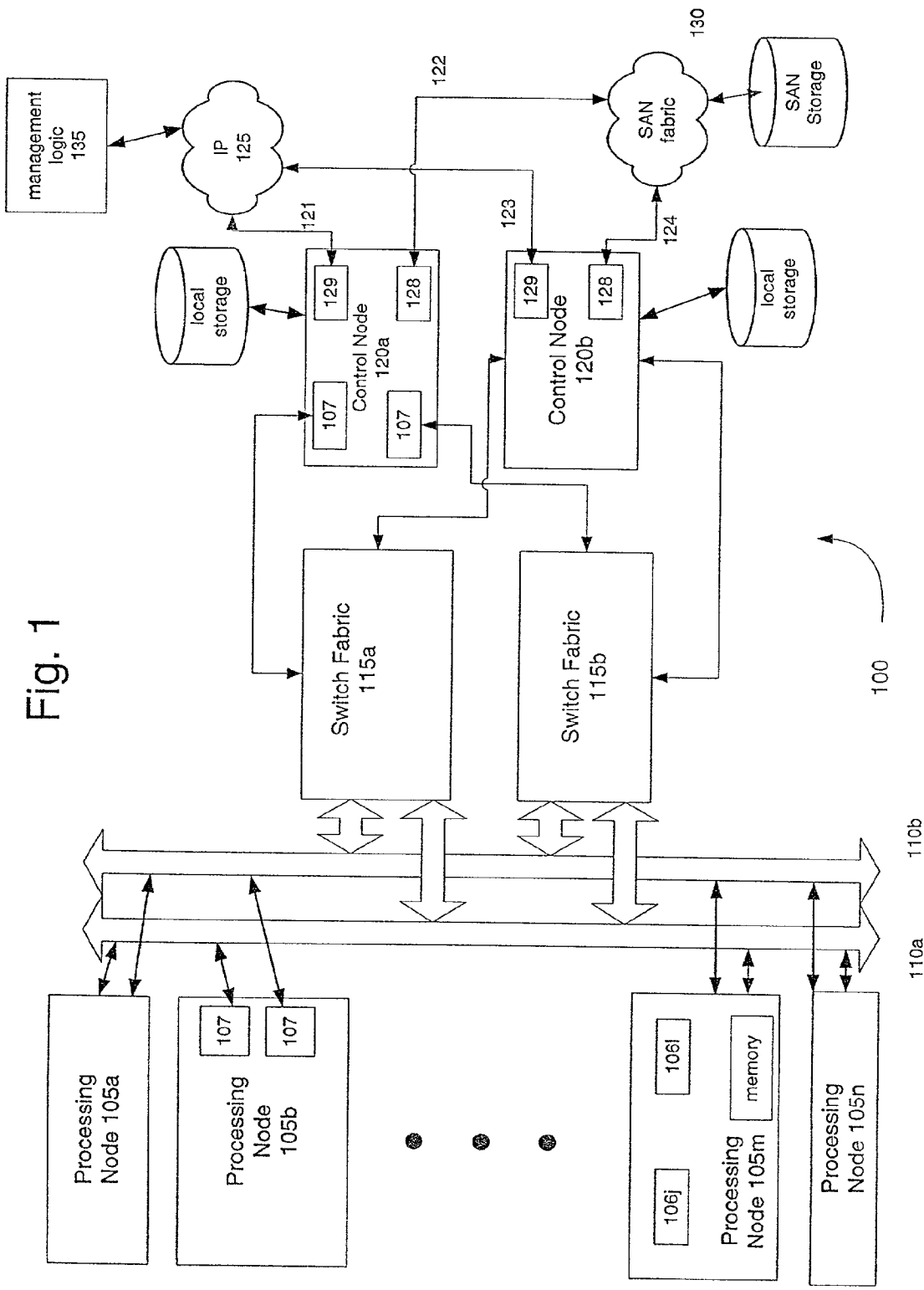
FIG. 1 is a system diagram illustrating one embodiment of the invention.

As shown in FIG. 1, a preferred hardware platform 100 includes a set of processing nodes 105a–n connected to a switch fabrics 115a,b via high-speed, interconnect 110a,b. The switch fabric 115a,b is also connected to at least one control node 120a,b that is in communication with an external IP network 125 (or other data communication network), and with a storage area network (SAN) 130. A management application 135, for example, executing remotely, may access one or more of the control nodes via the IP network 125 to assist in configuring the platform 100 and deploying virtualized PANs.

Under certain embodiments, about 24 processing nodes 105a–n, two control nodes 120, and two switch fabrics 115a,b are contained in a single chassis and interconnected with a fixed, pre-wired mesh of point-to-point (PtP) links. Each processing node 105 is a board that includes one or more (e.g., 4) processors 106j–l, one or more network interface cards (NICs) 107, and local memory (e.g., greater than 4 Gbytes) that, among other things, includes some BIOS firmware for booting and initialization. There is no local disk for the processors 106; instead all storage, including storage needed for paging, is handled by SAN storage devices 130.

Each control node 120 is a single board that includes one or more (e.g., 4) processors, local memory, and local disk storage for holding independent copies of the boot image and initial file system that is used to boot operating system software for the processing nodes 105 and for the control nodes 106. Each control node communicates with SAN 130 via 100 megabyte/second fibre channel adapter cards 128 connected to fibre channel links 122, 124 and communicates with the Internet (or any other external network) 125 via an external network interface 129 having one or more Gigabit Ethernet NICs connected to Gigabit Ethernet links 121,123. (Many other techniques and hardware may be used for SAN and external network connectivity.) Each control node includes a low speed Ethernet port (not shown) as a dedicated management port, which may be used instead of remote, web-based management via management application 135.

The switch fabrics is composed of one or more 30-port Giganet switches 115, such as the NIC-CLAN 1000 and clan 5300 switch, and the various processing and control nodes use corresponding NICs for communication with such a fabric module. Giganet switch fabrics have the semantics of a Non-Broadcast Multiple Access (NBMA) network. All inter-node communication is via a switch fabric. Each link is formed as a serial connection between a NIC 107 and a port in the switch fabric 115. Each link operates at 112 megabytes/second.

In some embodiments, multiple cabinets or chassises may be connected together to form larger platforms. And in other embodiments the configuration may differ; for example, redundant connections, switches and control nodes may be eliminated.

Under software control, the platform supports multiple, simultaneous and independent processing areas networks (PANs). Each PAN, through software commands, is configured to have a corresponding subset of processors 106 that may communicate via a virtual local area network that is emulated over the PtP mesh. Each PAN is also configured to have a corresponding virtual I/O subsystem. No physical deployment or cabling is needed to establish a PAN. Under certain preferred embodiments, software logic executing on the processor nodes and/or the control nodes emulates switched Ethernet semantics; other software logic executing on the processor nodes and/or the control nodes provides virtual storage subsystem functionality that follows SCSI semantics and that provides independent I/O address spaces for each PAN.

Network Architecture

Certain preferred embodiments allow an administrator to build virtual, emulated LANs using virtual components, interfaces, and connections. Each of the virtual LANs can be internal and private to the platform 100, or multiple processors may be formed into a processor cluster externally visible as a single IP address.

Under certain embodiments, the virtual networks so created emulate a switched Ethernet network, though the physical, underlying network is a PtP mesh. The virtual network utilizes IEEE MAC addresses, and the processing nodes support IETF ARP processing to identify and associate IP addresses with MAC addresses. Consequently, a given processor node replies to an ARP request consistently whether the ARP request came from a node internal or external to the platform.

FIG. 2A shows an exemplary network arrangement that may be modeled or emulated. A first subnet 202 is formed by processing nodes $PN_1$, $PN_2$, and $PN_k$ that may communicate with one another via switch 206. A second subnet 204 is formed by processing nodes $PN_k$ and $PN_m$ that may communicate with one another via switch 208. Under switched Ethernet semantics, one node on a subnet may communicate directly with another node on the subnet; for example, $PN_1$ may send a message to $PN_2$. The semantics also allow one node to communicate with a set of the other nodes; for example $PN_1$ may send a broadcast message to other nodes. The processing nodes $PN_1$ and $PN_2$ cannot directly communicate with $PN_m$ because $PN_m$ is on a different subnet. For $PN_1$ and $PN_2$ to communicate with $PN_m$ higher layer networking software would need to be utilized, which software would have a fuller understanding of both subnets. Though not shown in the figure, a given switch may communicate via an "uplink" to another switch or the like. As will be appreciated given the description below, the need for such uplinks is different than their need when the switches are physical. Specifically, since the switches are virtual and modeled in software they may scale horizontally as wide as needed. (In contrast, physical switches have a fixed number of physical ports sometimes the uplinks are needed to provide horizontal scalability.)

Figure 2B:
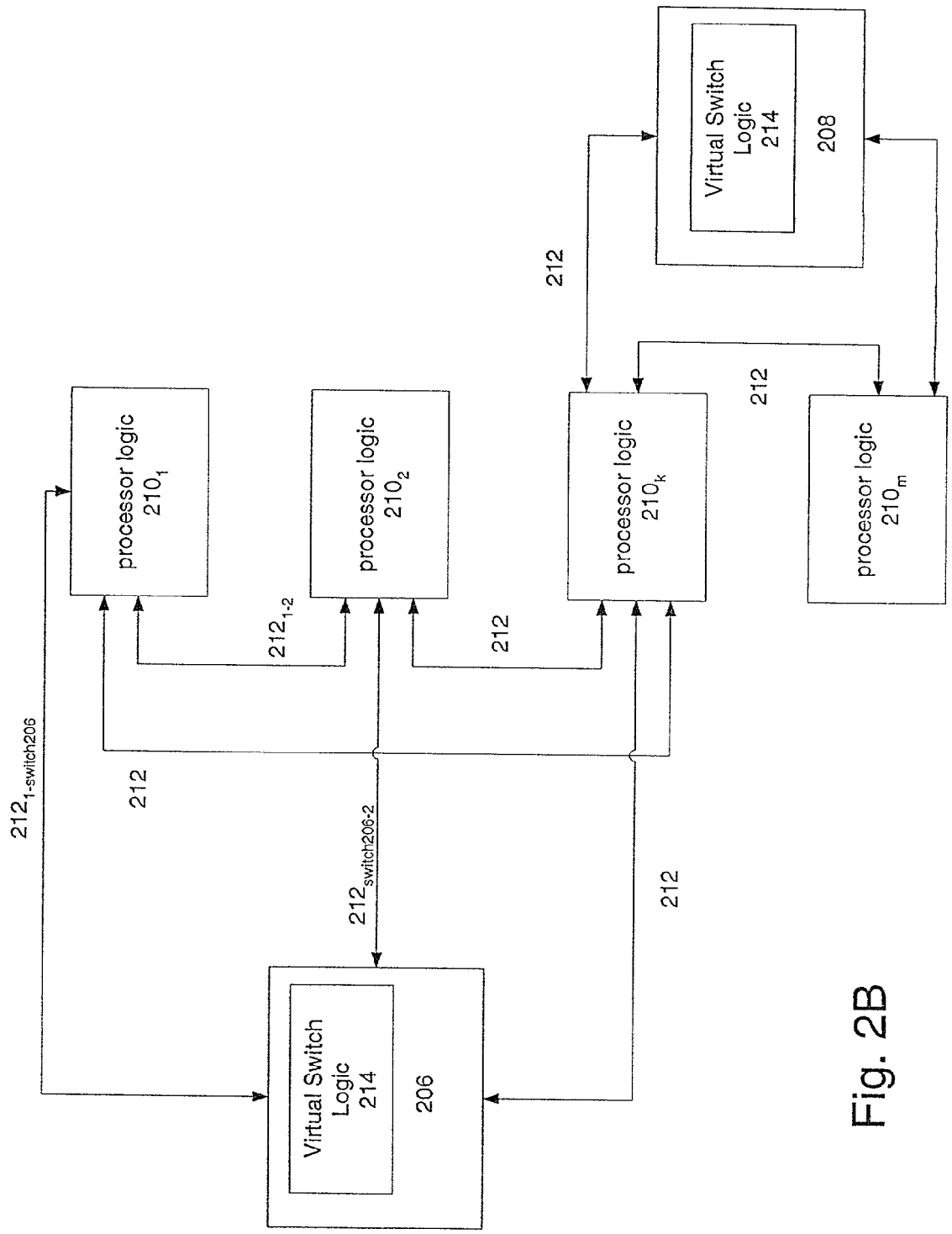

FIG. 2B shows exemplary software communication paths and logic used under certain embodiments to model the subnets 202 and 204 of FIG. 2A. The communication paths 212 connect processing nodes $PN_1$, $PN_2$, $PN_k$, and $PN_m$, specifically their corresponding processor-side network communication logic 210, and they also connect processing nodes to control nodes. (Though drawn as a single instance of logic for the purpose of clarity, $PN_k$ may have multiple instances of the corresponding processor logic, one per subnet, for example.) Under preferred embodiments, management logic and the control node logic are responsible for establishing, managing and destroying the communication paths. The individual processing nodes are not permitted to establish such paths.

As will be explained in detail below, the processor logic and the control node logic together emulate switched Ethernet semantics over such communication paths. For example, the control nodes have control node-side virtual switch logic 214 to emulate some (but not necessarily all) of the semantics of an Ethernet switch, and the processor logic includes logic to emulate some (but not necessarily all) of the semantics of an Ethernet driver.

Within a subnet, one processor node may communicate directly with another via a corresponding virtual interface 212. Likewise, a processor node may communicate with the control node logic via a separate virtual interface. Under certain embodiments, the underlying switch fabric and associated logic (e.g., switch fabric manager logic, not shown) provides the ability to establish and manage such virtual interfaces (VIs) over the point to point mesh. Moreover, these virtual interfaces may be established in a reliable, redundant fashion and are referred to herein in as RVIs. At points in this description, the terms virtual interface (VI) and reliable virtual interface (RVI) are used interchangeably, as the choice between a VI versus an RVI largely depends on the amount of reliability desired by the system at the expense of system resources.

Referring conjointly to FIGS. 2A–B, if node $PN_1$ is to communicate with node $PN_2$ it does so ordinarily by virtual interface $212_{1\text{-}2}$. However, preferred embodiments allow communication between $PN_1$ and $PN_2$ to occur via switch emulation logic, if for example VI $212_{1\text{-}2}$ is not operating satisfactorily. In this case a message may be sent via VI $212_{1\text{-}switch206}$ and via VI $212_{switch206\text{-}2}$. If $PN_1$ is to broadcast or multicast a message to other nodes in the subnet 202 it does so by sending the message to control node-side logic 214 via virtual interface $212_{1\text{-}switch206}$. Control node-side logic 214 then emulates the broadcast or multicast functionality by cloning and sending the message to the other relevant nodes using the relevant VIs. The same or analogous VIs may be used to convey other messages requiring control node-side logic. For example, as will be described below, control node-side logic includes logic to support the address resolution protocol (ARP), and VIs are used to communicate ARP replies and requests to the control node. Though the above description suggests just one VI between processor logic and control logic, many embodiments employ several such connections. Moreover, though the figures suggest symmetry in the software communication paths, the architecture actually allows asymmetric communication. For example, as will be discussed below, for communication clustered services the packets would be routed via the control node. However, return communication may be direct between nodes.

Notice that like the network of FIG. 2A, there is no mechanism for communication between node $PN_2$ and $PN_m$. Moreover, by having communication paths managed and created centrally (instead of via the processing nodes) such a path is not creatable by the processing nodes, and the defined subnet connectivity cannot be violated by a processor.

Figure 2C:
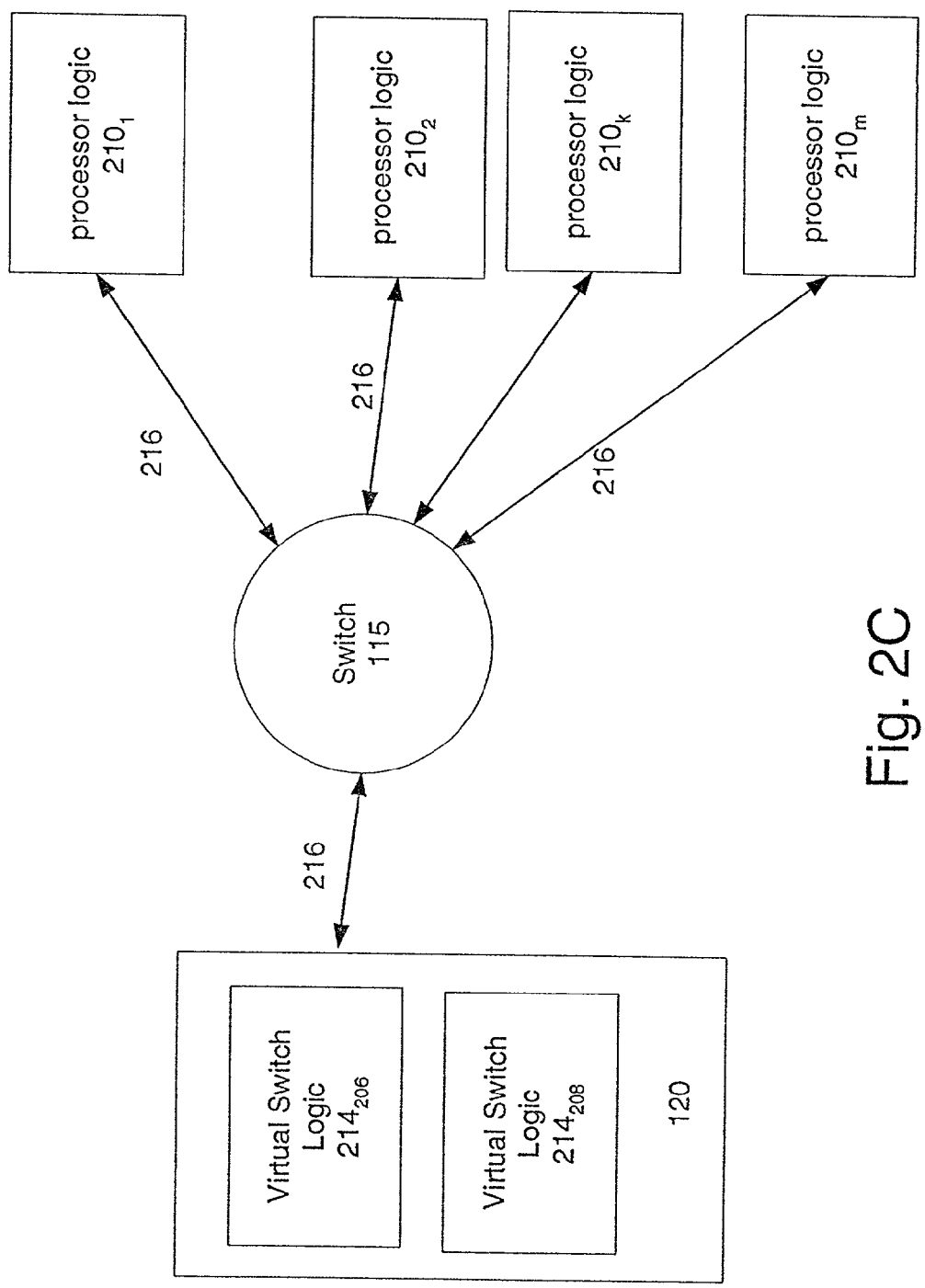

FIG. 2C shows the exemplary physical connections of certain embodiments to realize the subnets of FIGS. 2A and B. Specifically, each instance of processing network logic 210 communicates with the switch fabric 115 via a PtP links 216 of interconnect 110. Likewise, the control node has multiple instances of switch logic 214 and each communicates over a PtP conneciton 216 to the switch fabric. The virtual interfaces of FIG. 2B include the logic to convey information over these physical links, as will be described further below.

To create and configure such networks, an administrator defines the network topology of a PAN and specifies (e.g., via a utility within the management software 135) MAC address assignments of the various nodes. The MAC address is virtual, identifying a virtual interface, and not tied to any specific physical node. Under certain embodiments, MAC addresses follow the IEEE 48 bit address format, but in which the contents include a "locally administered" bit (set to 1), the serial number of the control node 120 on which the virtual interface was originally defined (more below), and a count value from a persistent sequence counter on the control node that is kept in NVRAM in the control node. These MACs will be used to identify the nodes (as is conventional) at a layer 2 level. For example, in replying to ARP requests (whether from a node internal to the PAN or on an external network) these MACs will be included in the ARP reply.

The control node-side networking logic maintains data structures that contain information reflecting the connectivity of the LAN (e.g., which nodes may communicate to which other nodes). The control node logic also allocates and assigns VI (or RVI) mappings to the defined MAC addresses and allocates and assigns VIs or (RVIs) between the control nodes and between the control nodes and the processing nodes. In the example of FIG. 2A, the logic would allocate and assign VIs 212 of FIG. 2B. (The naming of the VIs and RVIs in some embodiments is a consequence of the switching fabric and the switch fabric manager logic employed.)

As each processor boots, BIOS-based boot logic initializes each processor 106 of the node 105 and, among other things, establishes a (or discovers the) VI 212 to the control node logic. The processor node then obtains from the control node relevant data link information, such as the processor node's MAC address, and the MAC identities of other devices within the same data link configuration. Each processor then registers its IP address with the control node, which then binds the IP address to the node and an RVI (e.g., the RVI on which the registration arrived). In this fashion, the control node will be able to bind IP addresses for each virtual MAC for each node on a subnet. In addition to the above, the processor node also obtains the RVI or VI-related information for its connections to other nodes or to control node networking logic.

Thus, after boot and initialization, the various processor nodes should understand their layer 2, data link connectivity. As will be explained below, layer 3 (IP) connectivity and specifically layer 3 to layer 2 associations are determined during normal processing of the processors as a consequence of the address resolution protocol.

Figure 3A:
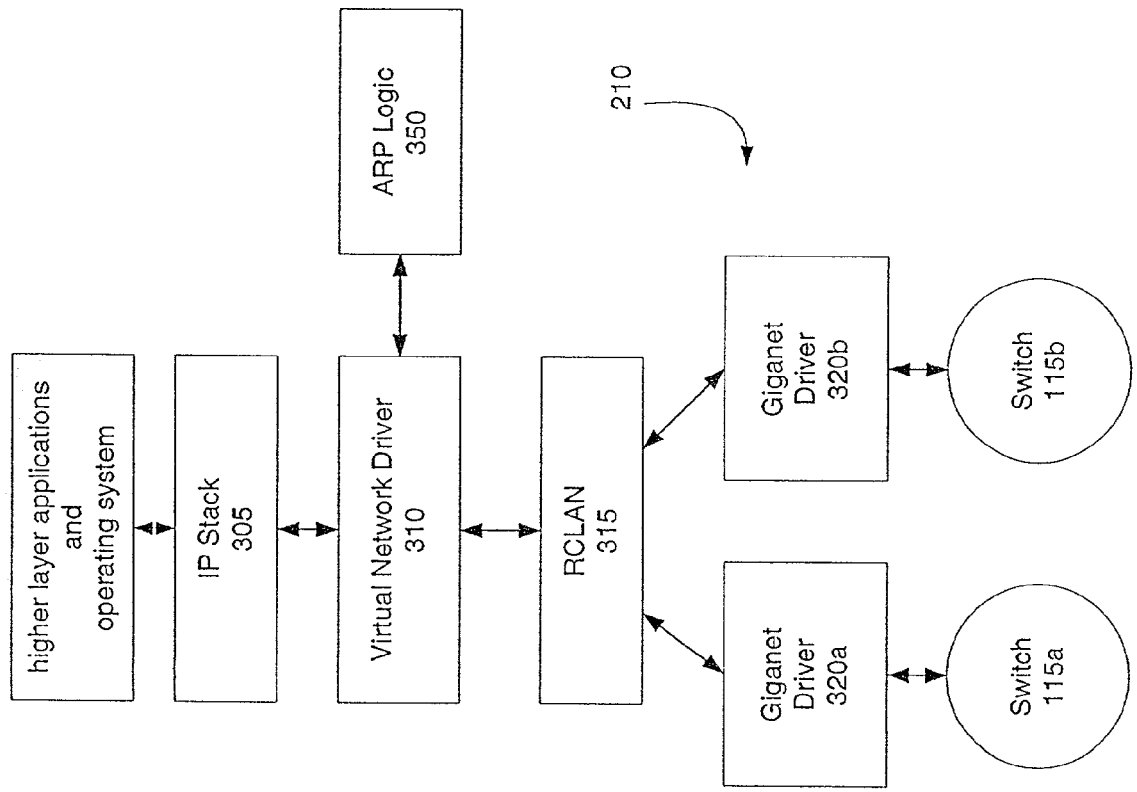
FIGS. 3A–B are diagrams illustrating the networking software architecture of certain embodiments of the invention.
Figure 3B:
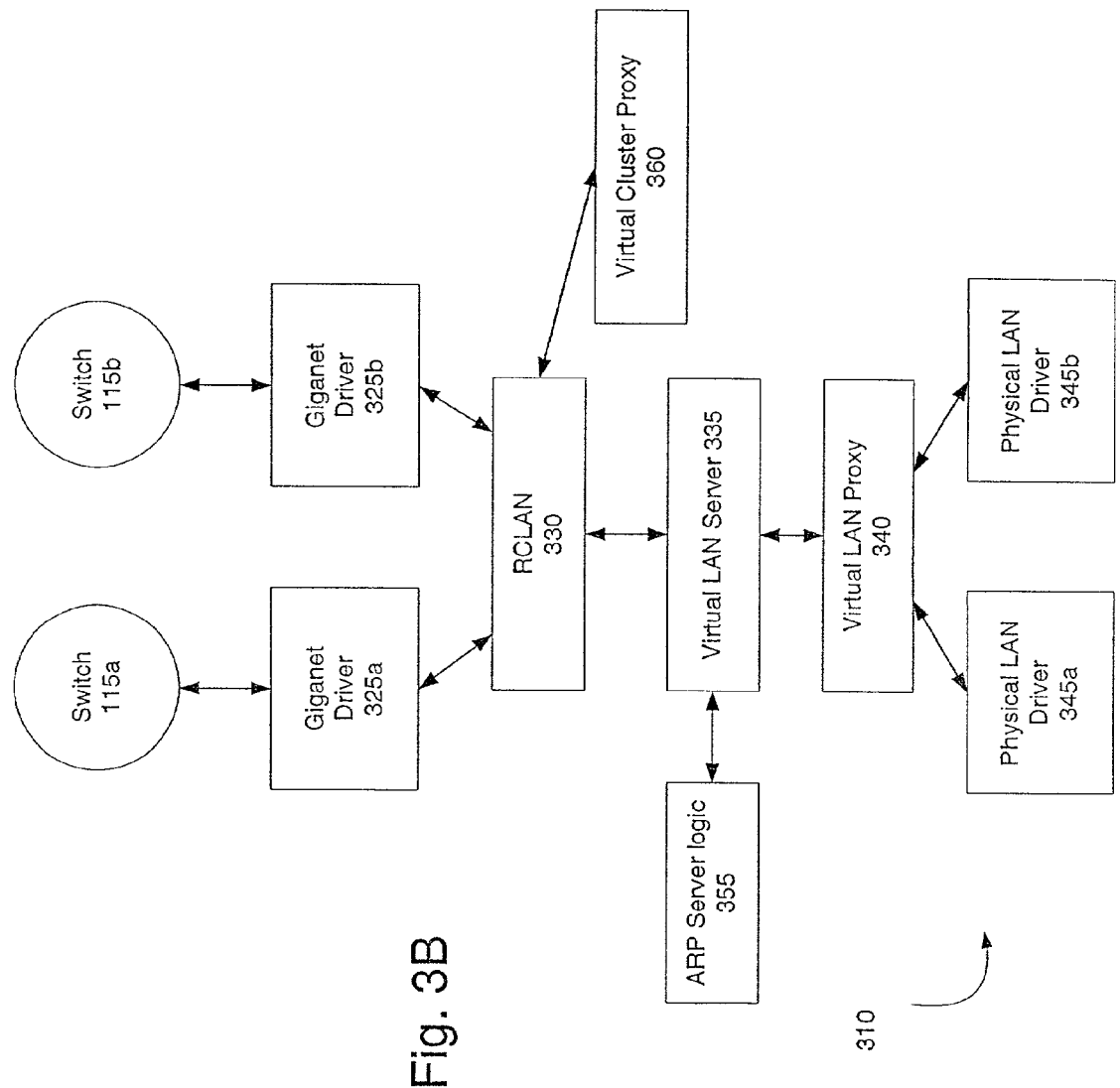

FIG. 3A details the processor-side networking logic 210 and FIG. 3B details the control node-side networking 310 logic of certain embodiments. The processor side logic 210 includes IP stack 305, virtual network driver 310, ARP logic 350, RCLAN layer 315, and redundant Giganet drivers 320a,b. The control node-side logic 310 includes redundant Giganet drivers 325a,b, RCLAN layer 330, virtual Cluster proxy logic 360, virtual LAN server 335, ARP server logic 355, virtual LAN proxy 340, and physical LAN drivers 345.

IP Stack

The IP stack 305 is the communication protocol stack provided with the operating system (e.g., Linux) used by the processing nodes 106. The IP stack provides a layer 3 interface for the applications and operating system executing on a processor 106 to communicate with the simulated Ethernet network. The IP stack provides packets of information to the virtual Ethernet layer 310 in conjunction with providing a layer 3, IP address as a destination for that packet. The IP stack logic is conventional except that certain embodiment avoid check sum calculations and logic.

Virtual Ethernet Driver

The virtual Ethernet driver 310 will appear to the IP stack 305 like a "real" Ethernet driver. In this regard, the virtual Ethernet driver 310 receives IP packets or datagrams from the IP stack for subsequent transmission on the network, and it receives packet information from the network to be delivered to the stack as an IP packet.

The stack builds the MAC header. The "normal" Ethernet code in the stack may be used. The virtual Ethernet driver receives the packet with the MAC header already built and the correct MAC address already in the header.

Figure 4A:
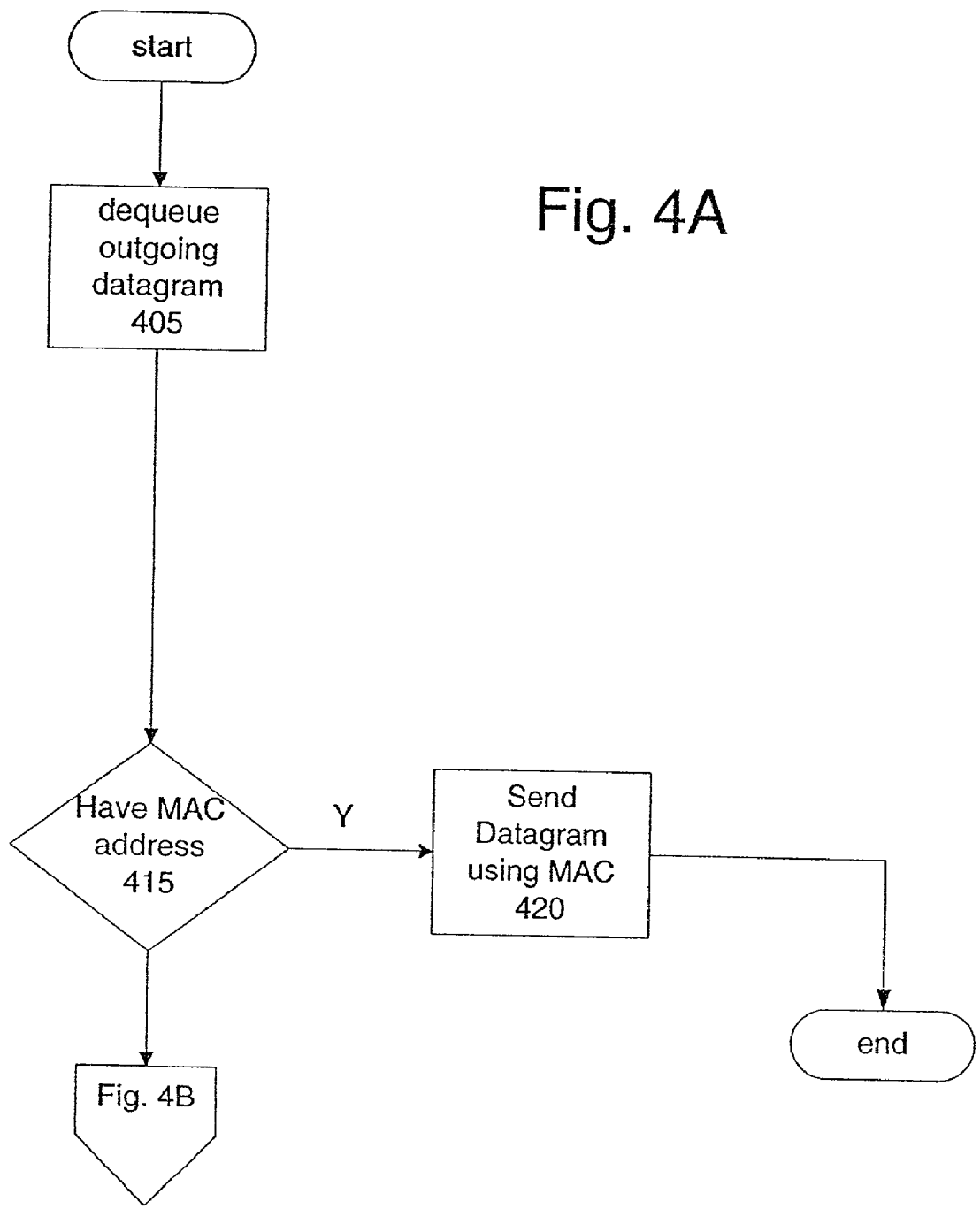
FIGS. 4A–C are flowcharts illustrating driver logic according to certain embodiments of the invention.
Figure 4B:
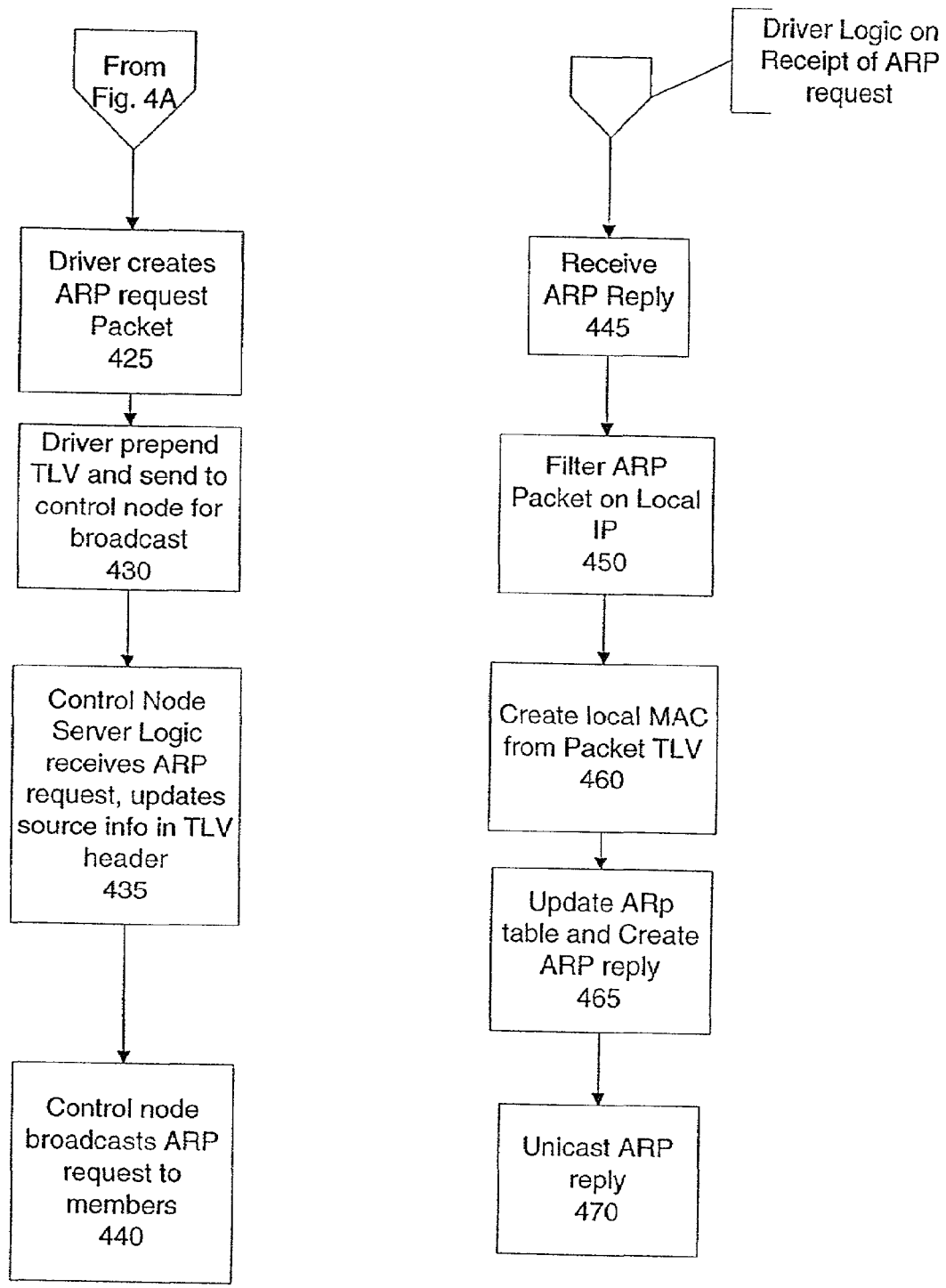
Figure 4C:
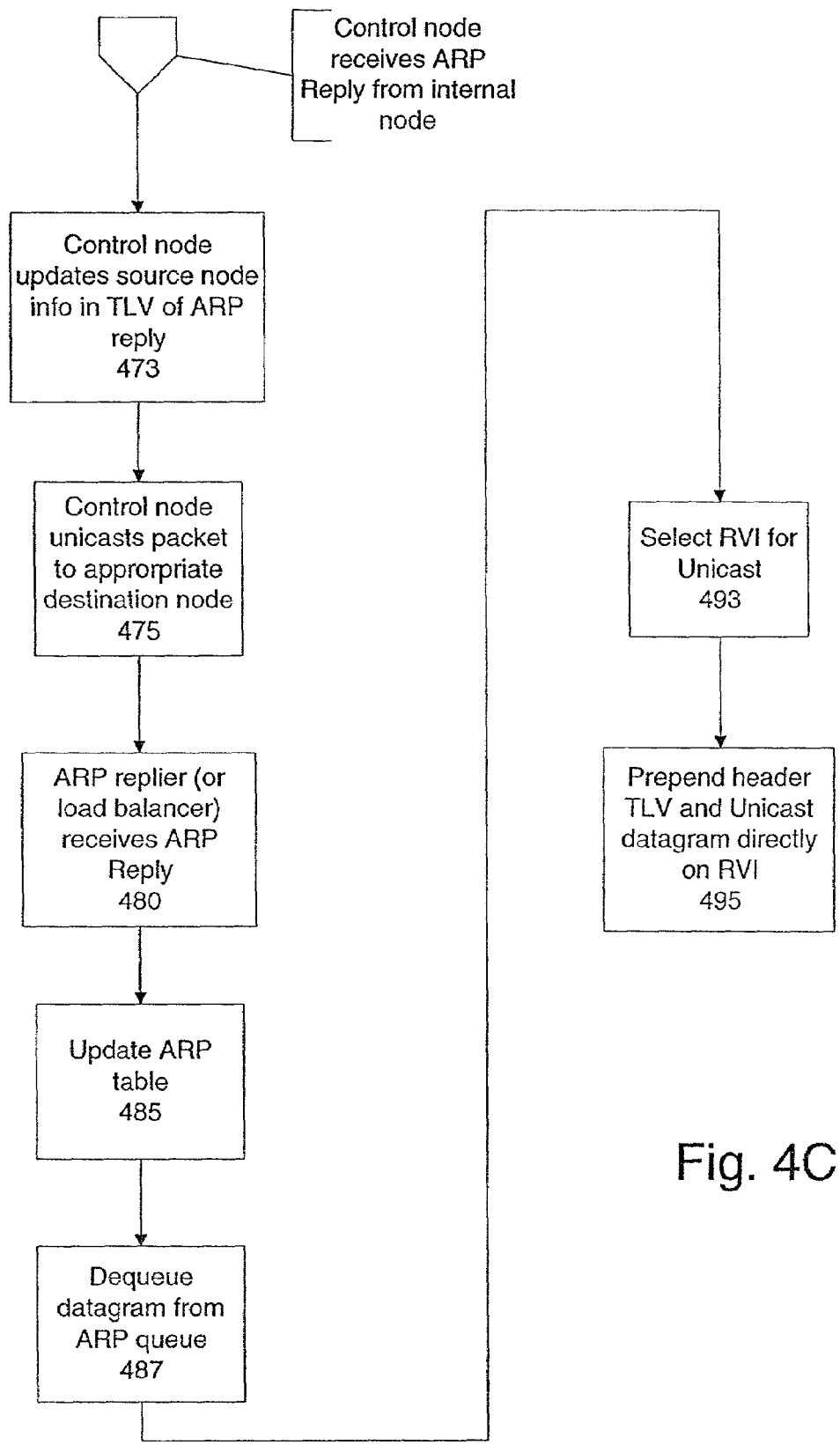

In material part and with reference to FIGS. 4A–C, the virtual Ethernet driver 310 dequeues 405 outgoing IP datagrams so that the packet may be sent on the network. The standard IP stack ARP logic is used. The driver, as will be explained below, intercepts all ARP packets entering and leaving the system to modify them so that the proper information ends up in each node's ARP tables. The normal ARP logic places the correct MAC address in the link layer header of the outgoing packet before the packet is queued to the Ethernet driver. The driver then just examines the link layer header and destination MAC to determine how to send the packet. The driver does not directly manipulate the ARP table (except for the occasional invalidation of ARP entries).

The driver 310 determines 415 whether ARP logic 350 has MAC address information (more below) associated with the IP address in the dequeued packet. If the ARP logic 350 has the information, the information is used to send 420 the packet accordingly. If the ARP logic 350 does not have the information, the driver needs to determine such information, and in certain preferred embodiments, this information is obtained as a result of an implementation of the ARP protocol as discussed in connection with FIGS. 4B–C.

If the ARP logic 350 has the MAC address information, the driver analyzes the information returned from the ARP logic 350 to determine where and how to send the packet. Specifically, the driver looks at the address to determine whether the MAC address is in a valid format or in a particular invalid format. For example, in one embodiment, internal nodes (i.e., PAN nodes internal to the platform) are signaled through a combination of setting the locally administered bit, the multicast bit, and another predefined bit pattern in the first byte of the MAC address. The overarching pattern is one which is highly improbable of being a valid pattern.

If the MAC address returned from the ARP logic is in a valid format, the IP address associated with that MAC address is for a node external at least to the relevant subnet and in preferred embodiments is external to the platform. To deliver such a packet, the driver prepends the packet with a TLV (type-length-value) header. The logic then sends the packet to the control node over a pre-established VI. The control node then handles the rest of the transmission as appropriate.

If the MAC address information returned from the ARP logic 350 is in a particular invalid format, the invalid format signals that the IP-addressed node is to an internal node, and the information in the MAC address information is used to help identify the VI (or RVI) directly connecting the two processing nodes. For example, the ARP table entry may hold information identifying the RVI 212 to use to send the packet, e.g., $212_{1-2}$, to another processing node. The driver prepends the packet with a TLV header. It then places address information into the header as well as information identifying the Ethernet protocol type. The logic then selects the appropriate VI (or RVI) on which to send the encapsulated packet. If that VI (or RVI) is operating satisfactorily it is used to carry the packet; if it is operating unsatisfactorily the packet is sent to the control node switch logic (more below) so that the switch logic can send it to the appropriate node. Though the ARP table may contain information to actually specify the RVI to use, many other techniques may be employed. For example, the information in the table may indirectly provide such information, e.g., by pointing to the information of interest or otherwise identifying the information of interest though not contain it.

For any multicast or broadcast type messages, the driver sends the message to the control node on a defined VI. The control node then clones the packet and sends it to all nodes (excluding the sending node) and the uplink accordingly.

If there is no ARP mapping then the upper layers would never have sent the packet to the driver. If there is no datalink layer mapping available, the packet is put aside until ARP resolution is completed. Once the ARP layer has finished ARPing, the packets held back pending ARP get their datalink headers build and the packets are then sent to the driver.

If the ARP logic has no mapping for an IP address of an IP packet from the IP stack and, consequently, the driver 310 is unable to determine the associated addressing information (i.e., MAC address or RVI-related information), the driver obtains such information by following the ARP protocol. Referring to FIGS. 4B–C, the driver builds 425 an ARP request packet containing the relevant IP address for which there is no MAC mapping in the local ARP table. The node then prepends 430 the ARP packet with a TLV-type header. The ARP request is then sent via a dedicated RVI to the control node-side networking logic—specifically, the virtual LAN server 335.

As will be discussed in more detail below, the ARP request packet is processed 435 by the control node and broadcast 440 to the relevant nodes. For example, the control node will flag whether the requesting node is part of an IP service cluster.

The Ethernet driver logic 310 at the relevant nodes receives 445 the ARP reply, and determines 450 if it is the target of the ARP request by comparing the target IP address with a list of locally configured IP addresses by making calls to the node's IP stack. If it is not the target, it passes up the packet without modification. If it is the target, the driver creates 460 a local MAC header from the TLV header and updates 465 the local ARP table and creates an ARP reply. The driver modifies the information in the ARP request (mainly the source MAC) and then passes the ARP request up normally for the upper layers to handle. It is the upper layers that form the ARP reply when necessary. The reply among other things contains the MAC address of the replying node and has a bit set in the TLV header indicating that the reply is from a local node. In this regard, the node responds according to IETF-type ARP semantics (in contrast to ATM ARP protocols in which ARP replies are handled centrally). The reply is then sent 470.

As will be explained in more detail below, the control node logic 335 receives 473 the reply and modifies it. For example, the control node may substitute the MAC address of a replying, internal node with information identifying the source cabinet, processing node number, RVI connection number, channel, virtual interface number, and virtual LAN name. Once the ARP reply is modified the control node logic then sends 475 the ARP reply to an appropriate node, i.e., the node that sent the ARP request, or in specific instances to the load balancer in an IP service cluster, discussed below.

Eventually, an encapsulated ARP reply is received 480. If the replying node is an external node, the ARP reply contains the MAC address of the replying node. If the replying node is an internal node, the ARP reply instead contains information identifying the relevant RVI to communicate with the node. In either case, the local table is updated 485.

The pending datagram is dequeued 487, and the appropriate RVI is selected 493. As discussed above, the appropriate RVI is selected based on whether the target node is internal or external. A TLV header is prepended to the packet and sent 495.

For communications within a virtual LAN the maximum transmission unit (MTU) is configured as 16896 bytes. Even though the configured MTU is 16896 bytes, the Ethernet driver 310 recognizes when a packet is being sent to an external network. Through the use of path MTU discovery, ICMP and IP stack changes, the path MTU is changed at the source node 105. This mechanism is also used to trigger packet check summing.

Certain embodiments of the invention support promiscuous mode through a combination of logic at the virtual LAN server 335 and in the virtual LAN drivers 310. When a virtual LAN driver 310 receives a promiscuous mode message from the virtual LAN server 335, the message contains information about the identity of the receiver desiring to enter promiscuous mode. This information includes the receiver's location (cabinet, node, etc), the interface number of the promiscuous virtual interface 310 on the receiver (required for demultiplexing packets), and the name of the virtual LAN to which the receiver belongs. This information is then used by the driver 310 to determine how to send promiscuous packets to the receiver (which RVI or other mechanism to use to send the packets). The virtual interface 310 maintains a list of promiscuous listeners on the same virtual LAN. When a sending node receives a promiscuous mode message it will update its promiscuous list accordingly.

When a packet is transmitted over a virtual Ethernet driver 310, this list will be examined. If the list is not empty, then the virtual Ethernet interface 310 will do the following:
If the outgoing packet is being broadcast or multicast, no promiscuous copy will be sent. The normal broadcast operation will transmit the packet to the promiscuous listener(s)
If the packet is a unicast packet with a destination other than the promiscuous listener, the packet will be cloned and sent to the promiscuous listeners.

The header TLV includes extra information the destination can use to demultiplex and validate the incoming packet. Part of this information is the destination virtual Ethernet interface number (destination device number on the receiving node). Since these can be different between the actual packet destination and the promiscuous destination, this header cannot simply be cloned. Thus, memory will have to be allocated for each header for each packet clone to each promiscuous listener. When the packet header for a promiscuous packet is built the packet type will be set to indicate that the packet was a promiscuous transmission rather than a unicast transmission.

The virtual Ethernet driver 310 is also responsible for handling the redundant control node connections. For example, the virtual Ethernet drivers will periodically test end-to-end connectivity by sending a heartbeat TLV to each connected RVI. This will allow virtual Ethernet drivers to determine if a node has stopped responding or whether a stopped node has started to respond again. When an RVI or control node 120 is determined to be down, the Ethernet driver will send traffic through the surviving control node. If both control nodes are functional the driver 310 will attempt to load balance traffic between the two nodes.

Certain embodiments of the invention provide performance improvements. For example, with modifications to the IP stack 305, packets sent only within the platform 100 are not check summed since all elements of the platform 100 provide error detection and guaranteed data delivery.

In addition, for communications within a PAN (or even within a platform 100) the RVI may be configured so that the packets may be larger than the maximum size permitted by Ethernet. Thus, while the model emulates Ethernet behavior in certain embodiments maximum packet size may be violated to improve performance. The actual packet size will be negotiated as part of the data link layer.

Failure of a control node is detected either by a notification from the RCLAN layer, or by a failure of heartbeat TLVs. If a control node fails the Ethernet driver 310 will send traffic only to the remaining control node. The Ethernet driver 310 will recognize the recovery of a control node via notification from the RCLAN layer or the resumption of heartbeat TLVs. Once a control node has recovered, the Ethernet driver 310 will resume load balancing.

If a node detects that it cannot communicate with another node via a direct RVI (as outlined above) the node attempts to communicate via the control node, acting as a switch. Such failure may be signaled by the lower RCLAN layer, for example from failure to receive a virtual interface acknowledgement or from failures detected through heartbeat mechanisms. In this instance, the driver marks bits in the TLV header accordingly to indicate that the message is to be unicast and sends the packet to the control node so that it can send the packet to the desired node (e.g., based on the IP address, if necessary).

RCLAN Layer

The RCLAN layer 315 is responsible for handling the redundancy, fail-over and load balancing logic of the redundant interconnect NICs 107. This includes detecting failures, re-routing traffic over a redundant connection on failures, load balancing, and reporting inability to deliver traffic back to the virtual network drivers 310. The virtual ethernet drivers 310 expect to be notified asynchronously when there is a fatal error on any VI that makes the VI unusable or if any VI is taken down for any reason.

Under normal circumstances the virtual network driver 310 on each processor will attempt to load balance outgoing packets between available control nodes. This can be done via simple round-robin alternation between available control nodes, or by keeping track of how many bytes have been transmitted on each and always transmitting on the control nodes through which fewest bytes have been sent.

The RCLAN provides high bandwidth (224 MB/sec each way) low latency reliable asynchronous point-to-point communication between kernels. The sender of the data is notified if the data cannot be delivered and a best effort will be made to deliver it. The RCLAN uses two Giganet clan 1000 cards to provide redundant communication paths between kernels. It seamlessly recovers single failures in the clan 1000 cards or the Giganet switches. It detects lost data and data errors and resends the data if needed. Communication will not be disrupted as long as one of the connections is partially working, e.g., the error rate does not exceed 5%. Clients of the RCLAN include the RPC mechanism, the remote SCSI mechanism, and remote Ethernet. The RCLAN also provide a simple form of flow control. Low latency and high concurrency are achieved by allowing multiple simultaneous requests for each device to be sent by the processor node to the control node, so that they can be forwarded to the device as soon as possible or, alternatively so that they can be queued for completion as close to the device as possible as opposed to queuing all requests on the processor node.

The RCLAN layer 330 on the control node-side operates analogously to the above.

Giganet Driver

The Giganet driver logic 320 is the logic responsible for providing an interface to the Giganet NIC 107, whether on a processor 106 or control node 120. In short, the Giganet driver logic establishes VI connections, associated by VI id'ss, so that the higher layers, e.g., RCLAN 315 and Ethernet driver 310, need only understand the semantics of VI's.

Giganet driver logic 320 is responsible for allocating memory in each node for buffers and queues for the VI's, and for conditioning the NIC 107 to know about the connection and its memory allocation. Certain embodiments use VI connections provided by the Giganet driver. The Giganet NIC driver code establishes a Virtual Interface pair (i.e., VI) and assigns it to a corresponding virtual interface id.

Each VI is a bi-directional connection established between one Giganet port and another, or more precisely between memory buffers and memory queues on one node to buffers and queues on another. The allocation of ports and memory is handled by the NIC drivers as stated above. Data is transmitted by placing it into a buffer the NIC knows about and triggering action by writing to a specific memory-mapped register. On the receiving side, the data appears in a buffer and completion status appears in a queue. The data never need be copied if the sending and receiving programs are capable of producing and consuming messages in the connection's buffers. The transmission can even be direct from application program to application program if the operating system memory-maps the connection's buffers and control registers into application address space. Each Giganet port can support 1024 simultaneous VI connections over it and keep them separate from each other with hardware protection, so the operating system as well as disparate applications can safely share a single port. Under one embodiment of the invention, 14 VI connections may be established simultaneously from every port to every other port.

In preferred embodiments, the NIC drivers establish VI connections in redundant pairs, with one connection of the pair going through one of the two switch fabrics 115a,b and the other through the other switch. Moreover, in preferred embodiments, data is sent alternately on the two legs of the pair, equalizing load on the switches. Alternatively, the redundant pairs may be used in fail-over manner.

All the connection pairs established by the node persist as long as the operating system remains up. Establishment of a connection pair to simulate an Ethernet connection is intended to be analogous to, and as persistent as, physically plugging in a cable between network interface cards. If a node's defined configuration changes while its operating system is running, then applicable redundant Virtual Interface connection pairs will be established or discarded at the time of the change.

The Giganet driver logic 325 on the control node-side operates analogously to the above.

Virtual LAN Server

The virtual LAN server logic 335 facilitates the emulation of an Ethernet network over the underlying NBMA network. The virtual LAN server logic
1. manages membership to a corresponding virtual LAN;
2. provides RVI mapping and management;
3. ARP processing and IP mapping to RVI;
4. provides broadcast and multicast services;
5. facilitates bridging and routing to other domains; and
6. manages service clusters.

1. Virtual LAN Membership Management

Administrators configure the virtual LANs using management application 135. Assignment and configuration of IP addresses on virtual LANs may done in the same way as on an "ordinary" subnet. The choice of IP addresses to use is dependent on the external visibility of nodes on a virtual LAN. If the virtual LAN is not globally visible (either not visible outside the platform 100, or from the Internet), private IP addresses should be used. Otherwise, IP addresses must be configured from the range provided by the internet service provider (ISP) that provides the Internet connectivity. In general, virtual LAN IP address assignment must be treated the same as normal LAN IP address assignment. Configuration files stored on the local disks of the control node 120 define the IP addresses within a virtual LAN. For the purposes of a virtual network interface, an IP alias just creates another IP to RVI mapping on the virtual LAN server logic 335. Each processor may configure multiple virtual interfaces as needed. The primary restrictions on the creation and configuration of virtual network interfaces are IP address allocation and configuration.

Each virtual LAN has a corresponding instance of server logic 335 that executes on both of the control nodes 120 and a number of nodes executing on the processor nodes 105. The topology is defined by the administrator.

Each virtual LAN server 335 is configured to manage exactly one broadcast domain, and any number of layer 3 (IP) subnets may be present on the given layer 2 broadcast domain. The servers 335 are configured and created in response to administrator commands to create virtual LANs.

When a processor 106 boots and configures its virtual networks, it connects to the virtual LAN server 335 via a special management RVI. The processors then obtain their data link configuration information, such as the virtual MAC addresses assigned to it, virtual LAN membership information and the like. The virtual LAN server 335 will determine and confirm that the processor attempting to connect to it is properly a member of the virtual LAN that that server 335 is servicing. If the processor is not a virtual LAN member, the connection to the server is rejected. If it is a member, the virtual network driver 310 registers its IP address with the virtual LAN server. (The IP address is provided by the IP stack 305 when the driver 310 is configured.) The virtual LAN server then binds that IP address to an RVI on which the registration arrived. This enables the virtual LAN server to find the processor associated with a specific IP address.

Additionally, the association of IP addresses with a processor can be performed via the virtual LAN management interface 135. The latter method is necessary to properly configure cluster IP addresses or IP addresses with special handling, discussed below.

2. RVI Mapping and Management

As outlined above, certain embodiments use RVIs to connect nodes at the data link layer and to form control connections. Some of these connections are created and assigned as part of control nodes booting and initialization. The data link layer connections are used for the reasons described above. The control connections are used to exchange management, configuration, and health information.

Some RVI connections are between nodes for unicast traffic, e.g., $212_{1-2}$. Other RVI connections are to the virtual LAN server logic 335 so that the server can handle the requests, e.g., ARP traffic, broadcasts, and so on. To create the RVI the virtual LAN server 335 creates and removes RVIs through calls to a Giganet switch manager 360 (provided with the switch fabric and Giganet NICs). The switch manager may execute on the control nodes 120 and cooperates with the Giganet drivers to create the RVIs.

With regard to processor connections, as nodes register with the virtual LAN server 335, the virtual LAN server creates and assigns virtual MAC addresses for the nodes, as described above. In conjunction with this, the virtual LAN server logic maintains data structures reflecting the topology and MAC assignments for the various nodes. The virtual LAN server logic then creates corresponding RVIs for the unicast paths between nodes. These RVIs are subsequently allocated and made known to the nodes during the nodes booting. Moreover, the RVIs are also associated with IP addresses during the virtual LAN server's handling of ARP traffic. The RVI connections are torn down if a node is removed from the topology.

If a node 106 at one end of an established RVI connection is rebooted, the two operating systems of the each end of the connection, and RVI management logic re-establish the connection. Software using the connection on the processing node that remained up will be unaware that anything happened to the connection itself. Whether or not the software notices or cares that the software at the other end was rebooted depends upon what it is using the connection for and the extent to which the rebooted end is able to re-establish its state from persistent storage. For example, any software communicating via Transmission Control Protocol (TCP) will notice that all TCP sessions are closed by a reboot. On the other hand, Network File System (NFS) access is stateless and not affected by a reboot if it occurs within an allowed timeout period.

Should a node be unable to send a packet on a direct RVI at any time, it can always attempt to send the packet to a destination via the virtual LAN server 335. Since the virtual LAN server 335 is connected to all virtual Ethernet driver 310 interfaces on the virtual LAN via the control connections, virtual LAN server 335 can also serve as the packet relay mechanism of last resort.

With regard to the connections to the virtual LAN server 335, certain embodiments use virtual Ethernet drivers 310 that algorithmically determine the RVI that it ought to use to connect to its associated virtual LAN server 335. The algorithm, depending on the embodiment, may need to consider identification information such as cabinet number to identify the RVI.

3. ARP Processing and IP Mapping to RVIs

As explained above, the virtual Ethernet drivers 310 of certain embodiments support ARP. In these embodiments, ARP processing is used to advantage to create mappings at the nodes between IP addresses and RVIs that may be used to carry unicast traffic, including IP packets, between nodes.

To do this, the virtual Ethernet drivers 310 send ARP packet requests and replies to the virtual LAN server 335 via a dedicated RVI. The virtual LAN server 335, and specifically ARP server logic 355, handles the packets by adding information to the packet header. As was explained above, this information facilitates identification of the source and target and identifies the RVI that may be used between the nodes.

The ARP server logic 355 receives the ARP requests, processes the TLV header, and broadcasts the request to all relevant nodes on the internal platform and the external network if appropriate. Among other things, the server logic 355 determines who should receive the ARP reply, resulting from the request. For example, if the source is a clustered IP address, the reply should be sent to the cluster load balancer, not necessarily the source of the ARP request. The server logic 355 indicates such by including information in the TLV header of the ARP request, so that the target of the ARP replies accordingly. The server 335 will process the ARP packet by including further information in the appended header and broadcast the packet to the nodes in the relevant domain. For example, the modified header may include information identifying the source cabinet, processing node number, RVI connection number, channel, virtual interface number, and virtual LAN name (some of which is only known by the server 335).

The ARP replies are received by the server logic 355, which then maps the MAC information in the reply to corresponding RVI related information. The RVI-related information is placed in the target MAC entry of the reply and sent to the appropriate source node (e.g., may be the sender of the request, but in some instances such as with clustered IP addresses may be a different node).

4. Broadcast and Multicast Services

As outlined above, broadcasts are handled by receiving the packet on a dedicated RVI. The packet is then cloned by the server 335 and unicast to all virtual interfaces 310 in the relevant broadcast domain.

The same approach may be used for multicast. All multicast packets will be reflected off the virtual LAN server. Under some alternative embodiments, the virtual LAN server will treat multicast the same as broadcast and rely on IP filtering on each node to filter out unwanted packets.

When an application wishes to send or receive multicast addresses it must first join a multicast group. When a process on a processor performs a multicast join, the processor virtual network driver 310 sends a join request to the virtual LAN server 335 via a dedicated RVI. The virtual LAN server then configures a specific multicast MAC address on the interface and informs the LAN Proxy 340, discussed below, as necessary. The Proxy 340 will have to keep track of use counts on specific multicast groups so a multicast address is only removed when no processor belongs to that multicast group.

5. Bridging and Routing to other Domains

From the perspective of system 100, the external network 125 may operate in one of two modes: filtered or unfiltered. In filtered mode a single MAC address for the entire system is used for all outgoing packets. This hides the virtual MAC addresses of a processing node 107 behind the Virtual LAN Proxy 340 and makes the system appear as a single node on the network 125 (or as multiple nodes behind a bridge or proxy). Because this doesn't expose unique link layer information for each internal node 107 some other unique identifier is required to properly deliver incoming packets. When running in filter mode, the destination IP address of each incoming packet is used to uniquely identify the intended recipient since the MAC address will only identify the system. In unfiltered mode the virtual MACs of a node 107 are visible outside the system so that they may be used to direct incoming traffic. That is, filtered mode mandates layer 3 switching while unfiltered mode allows layer 2 switching. Filtered mode requires that some component (in this case the Virtual LAN Proxy 340) perform replacement of node virtual MAC addresses with the MAC address of the external network 125 on all outgoing packets.

Some embodiments support the ability for a virtual LAN to be connected to external networks. Consequently, the virtual LAN will have to handle IP addresses not configured locally. To address this, one embodiment imposes a limit that each virtual LAN so connected be restricted to one external broadcast domain. IP addresses and subnet assignments for the internal nodes of the virtual LAN will have to be in accordance with the external domain.

The virtual LAN server 335 services the external connection by effectively acting as a data link layer bridge in that it moves packets between the external Ethernet driver 345 and internal processors and performs no IP processing. However, unlike like a data link layer bridge, the server cannot always rely on distinctive layer two addresses from the external network to internal nodes and instead the connection may use layer 3 (IP) information to make the bridging decisions. To do this, the external connection software extracts IP address information from incoming packets and it uses this information to identify the correct node 106 so that it may move the packet to that node.

A virtual LAN server 335 having an attached external broadcast domain has to intercept and process packets from and to the external domain so that external nodes have a consistent view of the subnet(s) in the broadcast domain.

When virtual LAN server 335 having an attached external broadcast domain receives an ARP request from an external node it will relay the request to all internal nodes. The correct node will then compose the reply and send the reply back to the requester through the virtual LAN server 335. The virtual LAN server cooperates with the virtual LAN Proxy 340 so that the Proxy may handle any necessary MAC address translation on outgoing requests. All ARP Replies and ARP advertisements from external sources will be relayed directly to the target nodes.

Virtual Ethernet interfaces 310 will send all unicast packets with an external destination to the virtual LAN server 335 over the control connection RVI. (External destinations may be recognized by the driver by the MAC address format.) The virtual LAN server will then move the packet to the external network 125 accordingly.

If the virtual LAN server 335 receives a broadcast or multicast packet from an internal node it relays the packet to the external network in addition to relaying the packet to all internal virtual LAN members. If the virtual LAN server 335 receives a broadcast or multicast packet from an external source it relays the packet to all attached internal nodes.

Under certain embodiments, interconnecting virtual LANs through the use of IP routers or firewalls is accomplished using analogous mechanisms to those used in interconnecting physical LANs. One processor is configured on both LANs, and the Linux kernel on that processor must have routing (and possibly IP masquerading) enabled. Normal IP subnetting and routing semantics will always be maintained, even for two nodes located in the same platform.

A processor could be configured as a router between two external subnets, between and external and internal subnet, and between two internal subnets. When an internal node is sending a packet through a router there are no problems because of the point-to-point topology of the internal network. The sender will send directly to the router (i.e., processor so configured with routing logic) without the intervention of the virtual LAN server (i.e., typical processor to processor communication, discussed above).

When an external node sends a packet to an internal router, and the external network 125 is running in filtered mode, the destination MAC address of the incoming packet will be that of the platform 100. Thus the MAC address can not be used to uniquely identify the packet destination node. For a packet whose destination is an internal node on the virtual LAN, the destination IP address in the IP header is used to direct the packet to the proper destination node. However, because routers are not final destinations, the destination IP address in the IP header is that of the final destination rather than that of the next hop (which is the internal router). Thus, there is nothing in the incoming packet that can be used to direct it to the correct internal node. To handle this situation, one embodiment imposes a limit of no more than one router exposed to an external network on a virtual LAN. This router is registered with the virtual LAN server 335 as a default destination so that incoming packets with no valid destination will be directed to this default node.

When an external node sends a packet to an internal router and the external network 125 is running in unfiltered mode, the destination MAC address of the incoming packet will be the virtual MAC address of the internal destination node. The LAN Server 335 will then use this virtual MAC to send the packet directly to the destination internal node. In this case any number of internal nodes may be functioning as routers as the incoming packet's MAC address will uniquely identify the destination node.

If a configuration requires multiple routers on a subnet, one router can be picked as the exposed router. This router in turn could route to the other routers as necessary.

Under certain embodiments, router redundancy is provided, by making a router a clustered service and load balancing or failing over on a stateless basis (i.e., every IP packet rather than per-TCP connection).

Certain embodiments of the invention support promiscuous mode functionality by providing switch semantics in which a given port may be designated as a promiscuous port so that all traffic passing through the switch is repeated on the promiscuous port. The nodes that are allowed to listen in promiscuous mode will be assigned administratively at the virtual LAN server.

When a virtual Ethernet interface 310 enters promiscuous receive mode it will send a message to the virtual LAN server 335 over the management RVI. This message will contain all the information about the virtual Ethernet interface 310 entering promiscuous mode. When the virtual LAN Server receives a promiscuous mode message from a node, it will check its configuration information to determine if the node is allowed to listen promiscuously. If not, the virtual LAN Server will drop the promiscuous mode message without further processing. If the node is allowed to enter promiscuous mode, the virtual LAN server will broadcast the promiscuous mode message to all other nodes on the virtual LAN. The virtual LAN server will also mark the node as being promiscuous so that it can forward copies of incoming external packets to it. When a promiscuous listener detects any change in its RVI configuration it will send a promiscuous mode message to the virtual LAN to update the state of all other nodes on the relevant broadcast domain. This will update any nodes entering or leaving a virtual LAN. When a virtual Ethernet interface 310 leaves promiscuous it will send the virtual LAN server a message informing it that the interface is leaving promiscuous mode. The virtual LAN server will then send this message to all other nodes on the virtual LAN. Promiscuous settings will allow for placing an external connection in promiscuous mode when any internal virtual interface is a promiscuous listener. This will make the traffic external to the platform (but on the same virtual LAN) available to the promiscuous listener.

6. Managing Service Clusters

A service cluster is a set of services available at one or more IP address (or host names). Examples of these services are HTTP, FTP, telnet, NFS, etc. An IP address and port number pair represents a specific service type (though not a service instance) offered by the cluster to clients, including clients on the external network 125.

Figure 5:
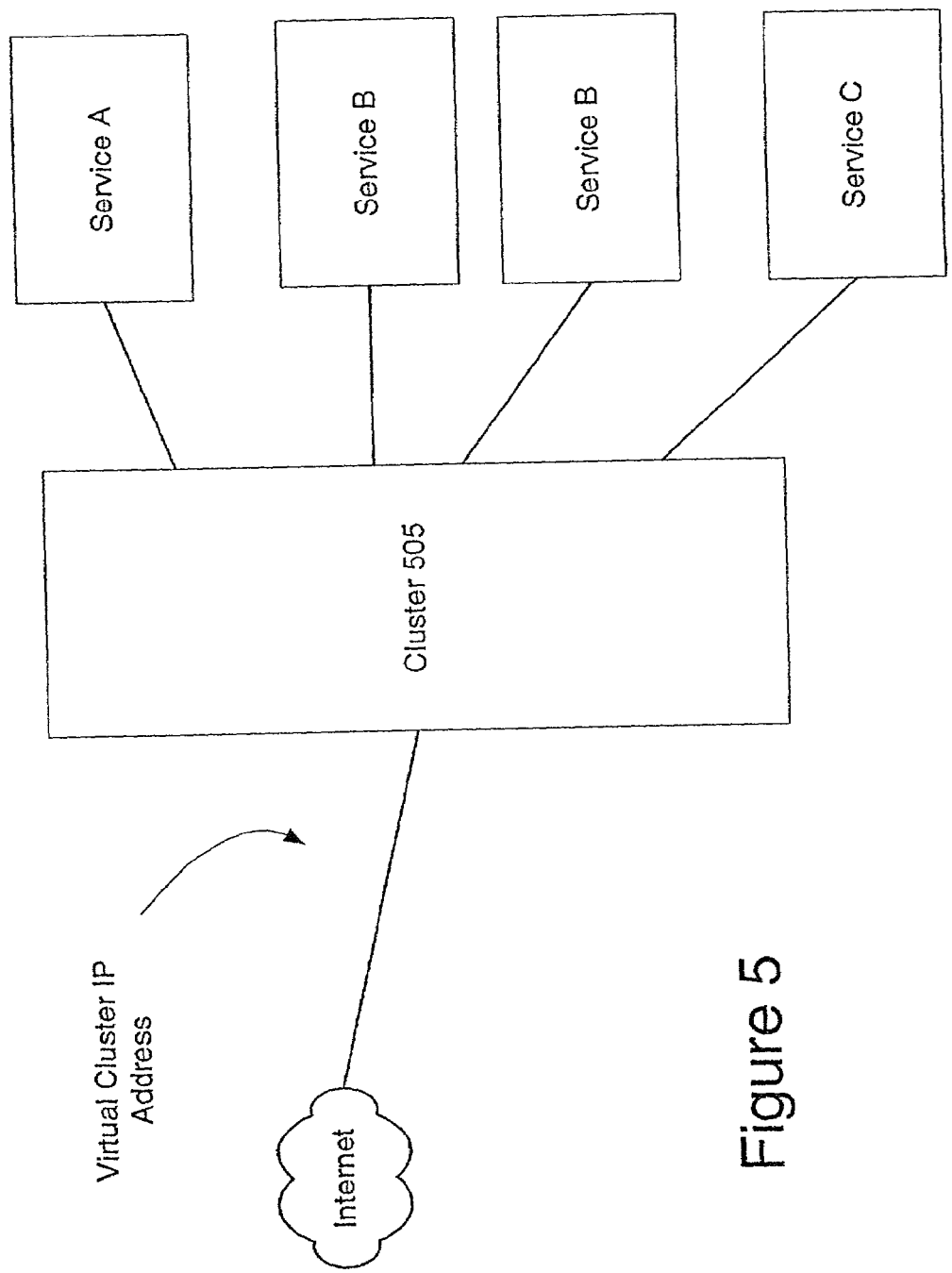
FIG. 5 illustrates service clusters according to certain embodiments of the invention.

FIG. 5 shows how certain embodiments present a virtual cluster 405 of services as a single virtual host to the Internet or other external network 125 via a cluster IP address. All the services of the cluster 505 are addressed through a single IP address, through different ports at that IP address. In the example of FIG. 5, service B is a load balanced service.

With reference to FIG. 3B, virtual clusters are supported by the inclusion of virtual cluster proxy (VCP) logic 360 which cooperates with the virtual LAN server 335. In short, VCP 360 is responsible for handling distribution of incoming connections, port filters, and real server connections for each configured virtual IP address. There will be one VCP for each clustered IP address configured.

When a packet arrives on the virtual cluster IP address, the virtual LAN Proxy logic 340 will send the packet to the VCP 360 for processing. The VCP will then decide where to send the packet based on the packet contents, its internal connection state cache, any load balancing algorithms being applied to incoming traffic, and the availability of configured services. The VCP will relay incoming packets based on both the destination IP address as well as the TCP or UDP port number. Further, it will only distribute packets destined for port numbers known to the VCP (or for existing TCP connections). It is the configuration of these ports, and the mapping of the port number to one or more processors that creates the virtual cluster and makes specific service instances available in the cluster. If multiple instances of the same service from multiple application processors are configured then the VCP can load balance between the service instances.

The VCP 360 maintains a cache of all active connections that exist on the cluster's IP address. Any load balancing decisions that are made will only be made when a new connection is established between the client and a service. Once the connection has been set up, the VCP will use the source and destination information in the incoming packet header to make sure all packets in a TCP stream get routed to the same processor 106 configured to provide the service. In the absence of the ability to determine a client session (for example, HTTP sessions), the actual connection/load balancing mapping cache will route packets based on client address so that subsequent connections from the same client goes to the same processor (making a client session persistent or "sticky"). Session persistence should be selectable on a service port number basis since only certain types of services require session persistence.

Replies to ARP requests, and routing of ARP replies, is handled by the VCP. When a processor sends any ARP packet, it will send it out through the Virtual Ethernet driver 310. The packet will then be sent to the virtual LAN Server 335 for normal ARP processing. The virtual LAN server will broadcast the packet as usual, but will make sure it doesn't get broadcast to any member of the cluster (not just the sender). It will also place information in the packet header TLV that indicates to the ARP target that the ARP source can only be reached through the virtual LAN server and specifically through the load balancer. The ARP target, whether internal or external, will process the ARP request normally and send a reply back through the virtual LAN server. Because the source of the ARP was a cluster IP address, the virtual LAN server will be unable to determine which processor sent out the original request. Thus, the virtual LAN Server will send the reply to each cluster member so that they can handle it properly. When an ARP packet is sent by a source with a cluster IP address as the target, the virtual LAN server will send the request to every cluster member. Each cluster member will receive the ARP request and process it normally. They will then compose an ARP reply and send it back to the source via the virtual LAN server. When the virtual LAN server receives any ARP reply from a cluster member it will drop that reply, but the virtual LAN server will compose and send an ARP reply to the ARP source. Thus, the virtual LAN Server will respond to all ARPs of the cluster IP address. The ARP reply will contain the information necessary for the ARP source to send all packets for the cluster IP address to the VCP. For external ARP sources, this will simply be an ARP reply with the external MAC address as the source hardware address. For internal ARP sources this will be the information necessary to tell the source to send packets for the cluster IP address down the virtual LAN management RVI rather than through a directly connected RVI. Any gratuitous ARP packets that are received will be forwarded to all cluster members. Any gratuitous ARP packets sent by a cluster member will be sent normally.

Virtual LAN Proxy

The virtual LAN Proxy 340 performs the basic co-ordination of the physical network resources among all the processors that have virtual interfaces to the external physical network 125. It bridges virtual LAN server 335 to the external network 125. When the external network 125 is running in filtered mode the Virtual LAN Proxy 340 will convert the internal virtual MAC addresses from each node to the single external MAC assigned to the system 100. When the external network 125 is operating in unfiltered mode no such MAC translation is required. The Virtual LAN Proxy 340 also performs insertion and removal of IEEE 802.1Q Virtual LAN ID tagging information, and demultiplexing packets based on their VLAN Ids. It also serializes access to the physical Ethernet interface 129 and co-ordinates the allocation and removal of MAC addresses, such as multicast addresses, on the physical network.

When the external network 125 is running in filtered mode and the virtual LAN Proxy 340 receives outgoing packets (ARP or otherwise) from a virtual LAN server 335, it replace the internal format MAC address with the MAC address of the physical Ethernet device 129 as the source MAC address. When the External Network 125 is running in unfiltered mode no such replacement is required.

When the virtual LAN Proxy 340 receives incoming ARP packets, it moves the packet to the virtual LAN server 335 which handles the packet and relays the packet on to the correct destination(s). If the ARP packet is a broadcast packet then the packet is relayed to all internal nodes on the Virtual LAN. If the packet is a unicast packet the packet is sent only to the destination node. The destination node is determined by the IP address in the ARP packet when the External Network 125 is running in filtered mode, or by the MAC address in the Ethernet header of the ARP packet (not the MAC address is the ARP packet).

Physical LAN Driver

Under certain embodiments, the connection to the external network 125 is via Gigabit or 100/10baseT Ethernet links connected to the control node. Physical LAN drivers 345 are responsible for interfacing with such links. Packets being sent on the interface will be queued to the device in the normal manner, including placing the packets in socket buffers. The queue used to queue the packets is the one used by the protocol stack to queue packets to the device's transmit routine. For incoming packets, the socket buffer containing the packets will be passed around and the packet data will never be copied (though it will be cloned if needed for multicast operations). Under these embodiments, generic Linux network device drivers may be used in the control node without modification. This facilitates the addition of new devices to the platform without requiring additional device driver work.

The physical network interface 345 is in communication only with the virtual LAN proxy 340. This prevents the control node from using the external connection in any way that would interfere with the operation of the virtual LANs and improves security and isolation of user data, i.e., an administrator may not "sniff" any user's packets.

Load Balancing and Failover

Under some embodiments, the redundant connections to the external network 125 will be used alternately to load balance packet transmission between two redundant interfaces to the external network 125. Other embodiments load balance by configuring each virtual network interface on alternating control nodes so the virtual interfaces are evenly distributed between the two control nodes. Another embodiment transmits through one control node and receives through another.

When in filtered mode, there will be one externally visible MAC address to which external nodes transmit packets for a set of virtual network interfaces. If that adapter goes down, then not only do the virtual network interfaces have to fail over to the other control node, but the MAC address must fail over too so that external nodes can continue to send packets to the MAC address already in the ARP caches.

Under one embodiment of the invention, when a failed control node recovers, a single MAC address is manipulated and the MAC address does not have to be remapped on recovery.

Under another embodiment of the invention, load balancing is performed by allowing transmission on both control nodes but only reception through one. The failover case is both send and receive through the same control node. The recovery case is transmission through the recovered control node since that doesn't require any MAC manipulation.

The control node doing reception has IP information for filtering and multicast address information for multicast MAC configuration. This information is needed to process incoming packets and should be failed over should the receiving control node fail. If the transmitting control node fails, virtual network drivers need only start sending outgoing packets only to the receiving control node. No special failover processing is required other than the recognition that the transmitting control node has failed. If the failed control node recovers the virtual network drivers can resume sending outgoing packets to the recovered control nodes without any additional special recovery processing. If the receiving control node fails then the transmitting control node must assume the receiving interface role. To do this, it must configure all MAC addresses on its physical interface to enable packet reception. Alternately, both control nodes could have the same MAC address configured on their interfaces, but receives could be physically disabled on the Ethernet device by the device driver until an control node is ready to receive packets. Then failover would simply enable receives on the device.

Because the interfaces must be configured with multicast MAC addresses when any processor has joined a multicast group, multicast information must be shared between control nodes so that failover will be transparent to the processor. Since the virtual network drivers will have to keep track of multicast group membership anyway, this information will always be available to a LAN Proxy via the virtual LAN server when needed. Thus, a receive failover will result in multicast group membership being queried from virtual network drivers to rebuild the local multicast group membership tables. This operations is low overhead and requires no special processing except during failover and recovery, and doesn't require any special replication of data between control nodes. When receive has failed over and the failed control node recovers, only transmissions will be moved over to the recovered control node. Thus, the algorithm for recovery on virtual network interfaces is to always move transmissions to the recovered control node and leave receive processing where it is.

Virtual service clusters may also use load balancing and failover.

Multicabinet Platforms

Some embodiments allow cabinets to be connected together to form larger platforms. Each cabinet will have at least one control node which will be used for inter-cabinet connections. Each control node will include a virtual LAN server 335 to handle local connections and traffic. One of the servers is configured to be a master, such as the one located on the control node with the external connection for the virtual LAN. The other virtual LAN server will act as proxy servers, or slaves, so that the local processors of those cabinets can participate. The master maintains all virtual LAN state and control while the proxies relay packets between the processors and masters.

Each virtual LAN server proxy maintains a RVI to each master virtual LAN Server. Each local processor will connect to the virtual LAN Server Proxy server just as if it were a master. When a processor connects and registers an IP and MAC address, the proxy will register that IP and MAC address with the master. This will cause the master to bind the addresses to the RVI from the proxy. Thus, the master will contain RVI bindings for all internal nodes, but proxies will contain bindings only for nodes in the same cabinet.

When an processor anywhere in a multicabinet virtual LAN sends any packet to its virtual LAN server, the packet will be relayed to the master for processing. The master will then do normal processing on the packet. The master will relay packets to the proxies as necessary for multicast and broadcast. The master will also relay unicast packets based on the destination IP address of the unicast packet and registered IP addresses on the proxies. Note that on the master, a proxy connection looks very much like a node with many configured IP addresses.

Networking Management Logic

During times when there is no operating system running on a processing node, such as booting or kernel debugging, the node's serial console traffic and boot image requests are routed by switch driver code located in the processing node's kernel debugging software or BIOS to management software running on a control node (not shown). From there, the console traffic can again be accessed either from the high-speed external network 125 or through the control node's management ports. The boot image requests can be satisfied from either the control node's local disks or from partitions out on the external SAN 130. The control node 120 is preferably booted and running normally before anything can be done to an processing node. The control node is itself booted or debugged from its management ports.

Some customers may wish to restrict booting and debugging of controllers to local access only, by plugging their management ports into an on-site computer when needed. Others may choose to allow remote booting and debugging by establishing a secure network segment for management purposes, suitably isolated from the Internet, into which to plug their management ports. Once a controller is booted and running normally, all other management functions for it and for the rest of the platform can be accessed from the high-speed external network 125 as well as the management ports, if permitted by the administrator.

Serial console traffic to and from each processing node 105 is sent by an operating system kernel driver over the switch fabric 115 to management software running on a control node 120. From there, any node's console traffic can be accessed either from the normal, high-speed external network 125 or through either of the control node's management ports.

Storage Architecture

Certain embodiments follow a SCSI model of storage. Each virtual PAN has its own virtualized I/O space and issues SCSI commands and status within such space. Logic at the control node translates or transforms the addresses and commands as necessary from a PAN and transmits them accordingly to the SAN 130 which services the commands. From the perspective of the SAN, the client is the platform 100 and the actual PANs that issued the commands are hidden and anonymous. Because the SAN address space is virtualized, one PAN operating on the platform 100 may have device numbering starting with a device number 1, and a second PAN may also have a device number 1. Yet each of the device number 1s will correspond to a different, unique portion of SAN storage.

Under preferred embodiments, an administrator can build virtual storage. Each of the PANs will have its own independent perspective of mass storage. Thus, as will be explained below, a first PAN may have a given device/LUN address map to a first location in the SAN, and a second PAN may have the same given device/LUN map to a second, different location in the SAN. Each processor maps a device/LUN address into a major and minor device number, to identify a disk and a partition, for example. Though the major and minor device numbers are perceived as a physical address by the PAN and the processors within a PAN, in effect they are treated by the platform as a virtual address to the mass storage provided by the SAN. That is, the major and minor device numbers of each processor are mapped to corresponding SAN locations.

Figure 6:
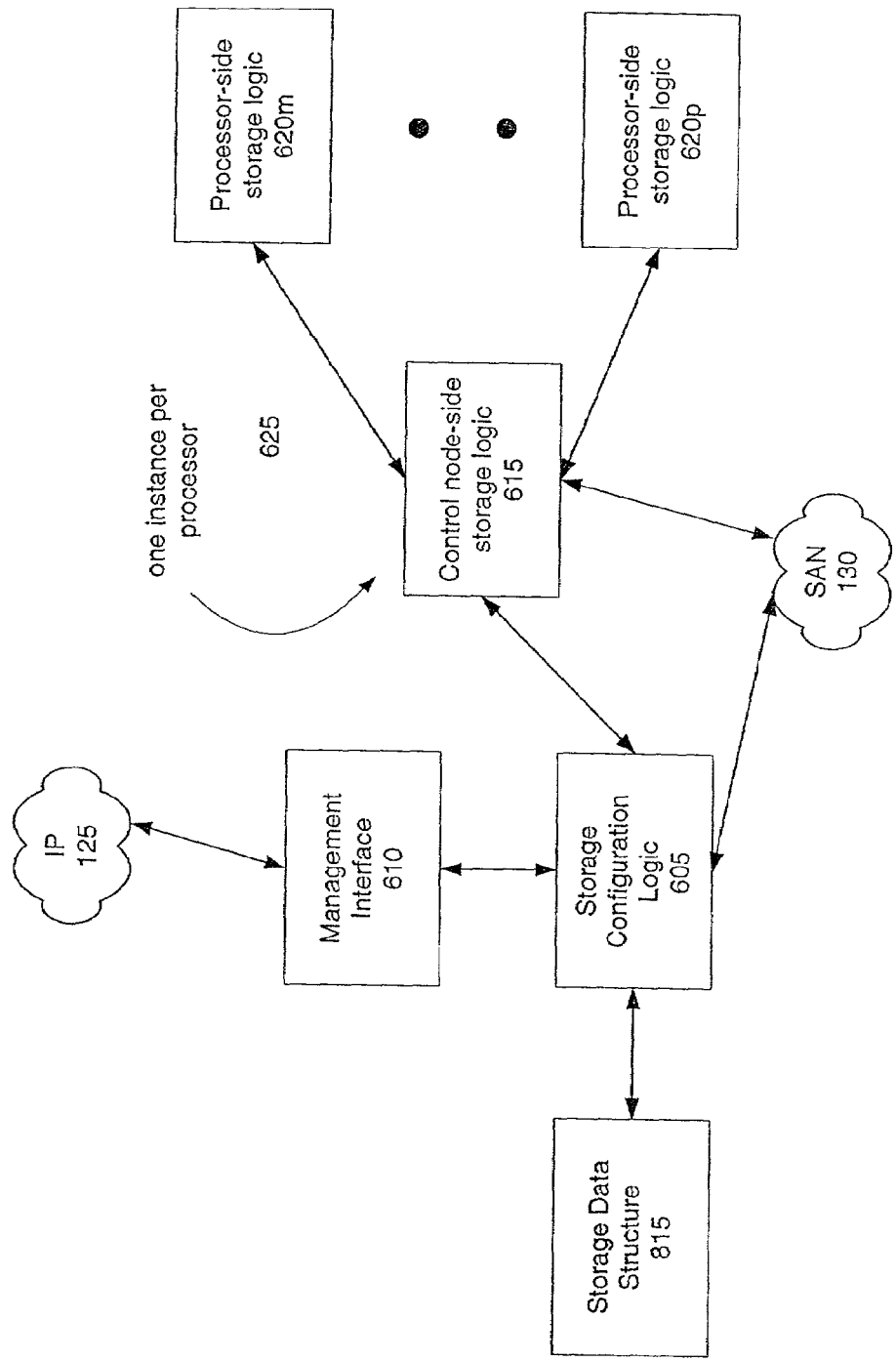
FIG. 6 illustrates the storage software architecture of certain embodiments of the invention.

FIG. 6 illustrates the software components used to implement the storage architecture of certain embodiments. A configuration component 605, typically executed on a control node 120, is in communication with external SAN 130. A management interface component 610 provides an interface to the configuration component 605 and is in communication with IP network 125 and thus with remote management logic 135 (see FIG. 1). Each processor 106 in the system 100 includes an instance of processor-side storage logic 620. Each such instance 620 communicates via 2 RVI connections 625 to a corresponding instance of control node-side storage logic 615.

In short, the configuration component 605 and interface 610 are responsible for discovering those portions of SAN storage that are allocated to the platform 100 and for allowing an administrator to suballocate portions to specific PANs or processors 106. Storage configuration logic 605 is also responsible for communicating the SAN storage allocations to control node-side logic 615. The processor-side storage logic 620 is responsible for communicating the processor's storage requests over the internal interconnect 110 and storage fabric 115 via dedicated RVIs 625 to the control node-side logic 615. The requests will contain, under certain embodiments, virtual storage addresses and SCSI commands. The control node-side logic is responsible for receiving and handling such commands by identifying the corresponding actual address for the SAN and converting the commands and protocol to the appropriate form for the SAN, for example, including but not limited to, fibre channel (Gigabit Ethernet with iSCSI is another exemplary connectivity).

Configuration Component

The configuration component 605 determines which elements in the SAN 130 are visible to each individual processor 106. It provides a mapping function that translates the device numbers (e.g., SCSI target and LUN) that the processor uses into the device numbers visible to the control nodes through their attached SCSI and Fibre Channel I/O interfaces 128. It also provides an access control function, which prevents processors from accessing external storage devices which are attached to the control nodes but not included in the processors' configuration. The model that is presented to the processor (and to the system administrator and applications/users on that processor) makes it appear as if each processor has its own mass storage devices attached to interfaces on the processor.

Among other things, this functionality allows the software on a processor 106 to be moved to another processor easily. For example, in certain embodiments, the control node via software (without any physical re-cabling) may change the PAN configurations to allow a new processor to access the required devices. Thus, a new processor may be made to inherit the storage personality of another.

Under certain embodiments, the control nodes appear as hosts on the SANs, though alternative embodiments allow the processors to act as such.

As outlined above, the configuration logic discovers the SAN storage allocated to the platform 100 (for example, during platform boot) and this pool is subsequently allocated by an administrator. If discovery is activated later, the control node that performs the discovery operation compares the new view with the prior view. Newly available storage is added to the pool of storage that may be allocated by an administrator. Partitions that disappear that were not assigned are removed from the available pool of storage that may be allocated to PANs. Partitions that disappear that were assigned trigger error messages.

Management Interface Component

The configuration component 605 allows management software to access and update the information which describes the device mapping between the devices visible to the control nodes 120 and the virtual devices visible to the individual processors 106. It also allows access to control information. The assignments may be identified by the processing node in conjunction with an identification of the simulated SCSI disks, e.g., by name of the simulated controller, cable, unit, or logical unit number (LUN).

Under certain embodiments the interface component 610 cooperates with the configuration component to gather and monitor information and statistics, such as:
Total number of I/O operations performed
Total number of bytes transferred
Total number of read operations performed
Total number of write operations performed
Total amount of time I/O was in progress Processor-side Storage Logic The processor-side logic 620 of the protocol is implemented as a host adapter module that emulates a SCSI subsystem by providing a low-level virtual interface to in the operating system on the processors 106. The processors 106 use this virtual interface to send SCSI I/O commands to the control nodes 120 for processing.

Figure 8:
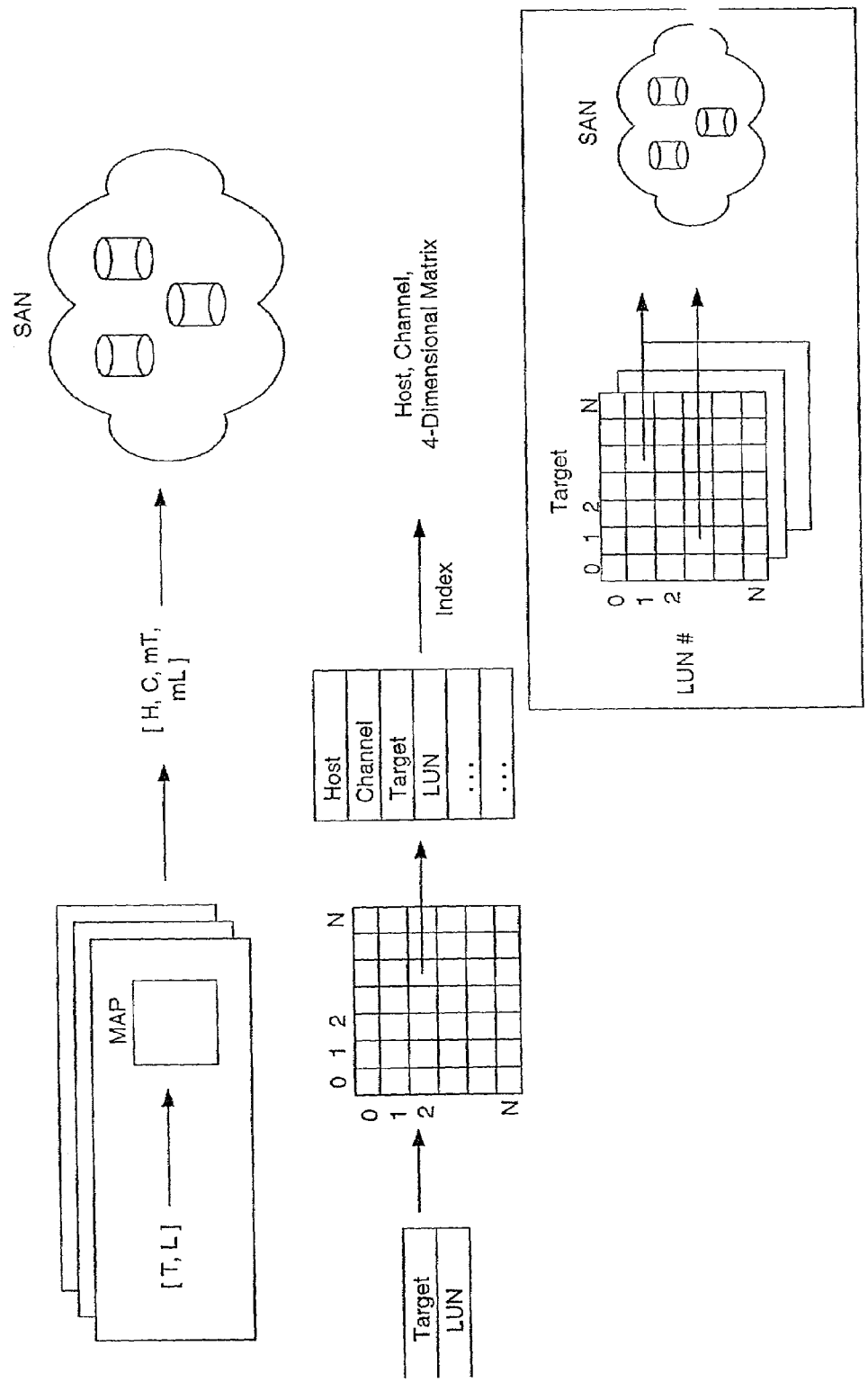
FIG. 8 illustrates the storage address mapping logic of certain embodiments of the invention.

Under embodiments employing redundant control nodes 120, each processing node 105 will include one instance of logic 620 per control node 120. Under certain embodiments, the processors refer to storage using physical device numbering, rather than logical. That is, the address is specified as a device name to identify the LUN, the SCSI target, channel, host adapter, and control node 120 (e.g., node 120a or 120b). As shown in FIG. 8, one embodiment maps the target (T) and LUN (L) to a host adapter (H), channel (C), mapped target (mT), and mapped LUN (mL).

Figure 7:
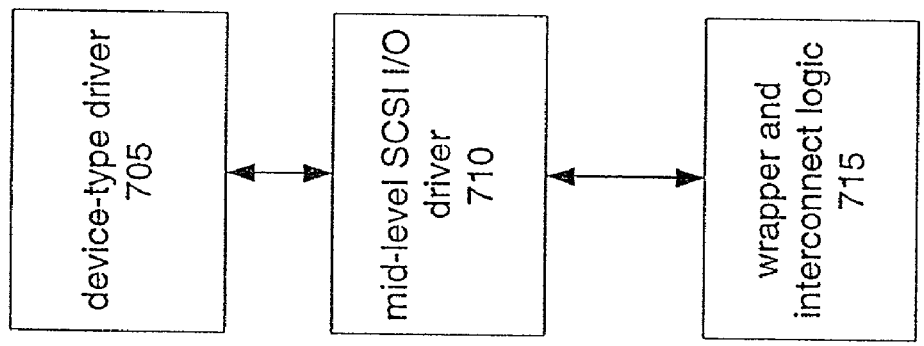
FIG. 7 illustrates the processor-side storage logic of certain embodiments of the invention.

FIG. 7 shows an exemplary architecture for processor side logic 720. Logic 720 includes a device-type-specific driver (e.g., a disk driver) 705, a midlevel SCSI I/O driver 710, and wrapper and interconnect logic 715.

The device-type-specific driver 705 is a conventional driver provided with the operating system and associated with specific device types.

The mid-level SCSI I/O driver 710 is a conventional mid-level driver that is called by the device-type-specific driver 705 once the driver 705 determines that the device is a SCSI device.

The wrapper and interconnect logic 715 is called by the mid-level SCSI I/O driver 710. This logic provides the SCSI subsystem interface and thus emulates the SCSI subsystem. In certain embodiments that use the Giganet fabric, logic 715 is responsible for wrapping the SCSI commands as necessary and for interacting with the Giganet and RCLAN interface to cause the NIC to send the packets to the control nodes via the dedicated RVIs to the control nodes, described above. The header information for the Giganet packet is modified to indicate that this is a storage packet and includes other information, described below in context. Though not shown in FIG. 7, wrapper logic 715 may use the RCLAN layer to support and utilize redundant interconnects 110 and fabrics 115.

For embodiments that use Giganet fabric 115, the RVIs of connection 725 are assigned virtual interface (VI) numbers from the range of 1024 available VIs. For the two endpoints to communicate, the switch 115 is programmed with a bi-directional path between the pair (control node switch port, control node VI number), (processor node 105 switch port, processor node VI number).

A separate RVI is used for each type of message sent in either direction. Thus, there is always a receive buffer pending on each RVI for a message that can be sent from the other side of the protocol. In addition, since only one type of message is sent in either direction on each RVI, the receive buffers posted to each of the RVI channels can be sized appropriately for the maximum message length that the protocol will use for that type of message. Under other embodiments, all of the possible message types are multiplexed onto a single RVI, rather than using 2 VIs. The protocol and the message format do not specifically require the use of 2 RVIs, and the messages themselves have message type information in their header so that they could be demultiplexed.

One of the two channels is used to exchange SCSI commands (CMD) and status (STAT) messages. The other channel is used to exchange buffer (BUF) and transmit (TRAN) messages. This channel is also used to handle data payloads of SCSI commands.

CMD messages contain control information, the SCSI command to be performed, and the virtual addresses and sizes of I/O buffers in the node 105. STAT messages contain control information and a completion status code reflecting any errors that may have occurred while processing the SCSI command. BUF messages contain control information and the virtual addresses and sizes of I/O buffers in the control node 120. TRAN messages contain control information and are used to confirm successful transmission of data from node 105 to the control node 120.

The processor side wrapper logic 715 examines the SCSI command to be sent to determine if the command requires the transfer of data and, if so, in what direction. Depending on the analysis, the wrapper logic 715 sets appropriate flag information in the message header accordingly. The section describing the control node-side logic describes how the flag information is utilized.

Under certain embodiments of the invention, the link 725 between processor-side storage logic 720 and control node-side storage logic 715 may be used to convey control messages, not part of the SCSI protocol and not to be communicated to the SAN 130. Instead, these control messages are to be handled by the control node-side logic 715.

The protocol control messages are always generated by the processor-side of the protocol and sent to the control node-side of the protocol over one of two virtual interfaces (VIs) connecting the processor-side logic 720 to the control node-side storage logic 715. The message header used for protocol control operations is the same as a command message header, except that different flag bits are used to distinguish the message as a protocol control message. The control node 120 performs the requested operation and responds over the RVI with a message header that is the same as is used by a status message. In this fashion, a separate RVI for the infrequently used protocol control operations is not needed.

Under certain embodiments using redundant control nodes, the processor-side logic 720 detects certain errors from issued commands and in response re-issues the command to the other control node. This retry may be implemented in a mid-level driver 710.

Control Node-side Storage Logic

Under certain embodiments, the control node-side storage logic 715 is implemented as a device driver module. The logic 715 provides a device-level interface to the operating system on the control nodes 120. This device-level interface is also used to access the configuration component 705. When this device driver module is initialized, it responds to protocol messages from all of the processors 106 in the platform 100. All of the configuration activity is introduced through the device-level interface. All of the I/O activity is introduced through messages that are sent and received through the interconnect 110 and switch fabric 115. On the control node 120, there will be one instance of logic 715 per processor node 105 (though it is only shown as one box in FIG. 7). Under certain embodiments, the control node-side logic 715 communicates with the SAN 130 via FCP or FCP-2 protocols, or iSCSI or other protocols that use the SCSI-2 or SCSI-3 command set over various media.

As described above, the processor-side logic sets flags in the RVI message headers indicating whether data flow is associated with the command and, if so, in which direction. The control node-side storage logic 715 receives messages from the processor-side logic and then analyzes the header information to determine how to act, e.g., to allocate buffers or the like. In addition, the logic translates the address information contained in the messages from the processor to the corresponding, mapped SAN address and issues the commands (e.g., via FCP or FCP-2) to the SAN 130.

A SCSI command such as a TEST UNIT READY command, which does not require a SCSI data transfer phase, is handled by the processor-side logic 720 sending a single command on the RVI used for command messages, and by the control node-side logic sending a single status message back over the same RVI. More specifically, the processor-side of the protocol constructs the message with a standard message header, a new sequence number for this command, the desired SCSI target and LUN, the SCSI command to be executed, and a list size of zero. The control node-side of the logic receives the message, extracts the SCSI command information and conveys it to the SAN 130 via interface 128. After the control node has received the command completion callback, it constructs a status message to the processor using a standard message header, the sequence number for this command, the status of the completed command, and optionally the request sense data if the command completed with a check condition status.

A SCSI command such as a READ command, which requires a SCSI data transfer phase to transfer data from the SCSI device into the host memory, is handled by the processor-side logic sending a command message to the control node-side logic 715, and the control node responding with one or more RDMA WRITE operation into memory in the processor node 105, and a single status message from the control node-side logic. More specifically, the processor-side logic 720 constructs a command message with a standard message header, a new sequence number for this command, the desired SCSI target and LUN, the SCSI command to be executed, and a list of regions of memory where the data from the command is to be stored. The control node-side logic 715 allocates temporary memory buffers to store the data from the SCSI operation while the SCSI command is executing on the control node. After the control node-side logic 715 has sent the SCSI command to the SAN 130 for processing and the command has completed it sends the data back to the processor 105 memory with a sequence of one or more RDMA WRITE operations. It then constructs a status message with a standard message header, the sequence number for this command, the status of the completed command, and optionally the REQUEST SENSE data if the command completed with a SCSI CHECK CONDITION status.

A SCSI command such as a WRITE command, which requires a SCSI data transfer phase to transfer data from the host memory to the SCSI device, is handled by the processor-side logic 720 sending a single command message to the control node-side logic 715, one or more BUF messages from the control node-side logic 715 to the processor-side logic, one or more RDMA WRITE operations from the processor-side storage logic into memory in the control node, one or more TRAN messages from the processor-side logic to the control node-side logic, and a single status message from the control node-side logic back to the processor-side logic. The use of the BUF messages to communicate the location of temporary buffer memory in the control node to the processor-side storage logic and the use of TRAN messages to indicate completion of the RDMA WRITE data transfer is due to the lack of RDMA READ capability in the underlying Giganet fabric. If the underlying fabric supports RDMA READ operations, a different sequence of corresponding actions may be employed. More specifically, the processor-side logic 720 constructs a CMD message with a standard message header, a new sequence number for this command, the desired SCSI target and LUN, and the SCSI command to be executed. The control node-side logic 715 allocates temporary memory buffers to store the data from the SCSI operation while the SCSI command is executing on the control node. The control node-side of the protocol then constructs a BUF message with a standard message header, the sequence number for this command, and a list of regions of virtual memory which are used for the temporary memory buffers on the control node. The processor-side logic 720 then sends the data over to the control node memory with a sequence of one or more RDMA WRITE operations. It then constructs a TRAN message with a standard message header, and the sequence number for this command After the control node-side logic has sent the SCSI command to the SAN 130 for processing and has received the command completion, it constructs a STAT message with a standard message header, the sequence number for this command, the status of the completed command, and optionally the REQUEST SENSE data if the command completed with a CHECK CONDITION status.

Under some embodiments, the CMD message contains a list of regions of virtual memory from where the data for the command is stored. The BUF and TRAN messages also contain an index field, which allows the control node-side of the protocol to send a separate BUF message for each entry in the region list in the CMD message. The processor-side of the protocol would respond to such a message by performing RDMA WRITE operations for the amount of data described in the BUF message, followed by a TRAN message to indicate the completion of a single segment of data transfer.

The protocol between the processor-side logic 720 and the control node-side logic 715 allows for scatter-gather I/O operations. This functionality allows the data involved in an I/O request to be read from or written to several distinct regions of virtual and/or physical memory. This allows mutliple, non-contiguous buffers to be used for the request on the control node.

As stated above, the configuration logic 705 is responsible for discovering the SAN storage allocated to the platform and for interacting with the interface logic 710 so that an administrator may suballocate the storage to specific PANs. As part of this allocation, the configuration component 705 creates and maintains a storage data structure 915 that includes information identifying the correspondence between processor addresses and actual SAN addresses. FIG. 7 shows such a structure. The correspondence, as described above, may be between the processing node and the identification of the simulated SCSI disks, e.g., by name of the simulated controller, cable, unit, or logical unit number (LUN).

Management Logic

Management logic 135 is used to interface to control node software to provision the PANs. Among other things, the logic 135 allows an administrator to establish the virtual network topology of a PAN, its visibility to the external network (e.g., as a service cluster), and to establish the types of devices on the PAN, e.g., bridges and routing.

The logic 135 also interfaces with the storage management interface logic 710 so that an administrator may define the storage for a PAN during initial allocation or subsequently. The configuration definition includes the storage correspondence (SCSI to SAN) discussed above and access control permissions.

As described above, each of the PANs and each of the processors will have a personality defined by its virtual networking (including a virtual MAC address) and virtual storage. The structures that record such personality may be accessed by management logic, as described below, to implement processor clustering. In addition, they may be accessed by an administrator as described above or with an agent administrator. An agent for example may be used to reconfigure a PAN in response to certain events, such as time of day or year, or in response to certain loads on the system.

The operating system software at a processor includes serial console driver code to route console I/O traffic for the node over the Giganet switch 115 to management software running on a control node. From there, the management software can make any node's console I/O stream accessible via the control node's management ports (its low-speed Ethernet port and its Emergency Management Port) or via the high-speed external network 125, as permitted by an administrator. Console traffic can be logged for audit and history purposes.

Cluster Management Logic

Figure 9:
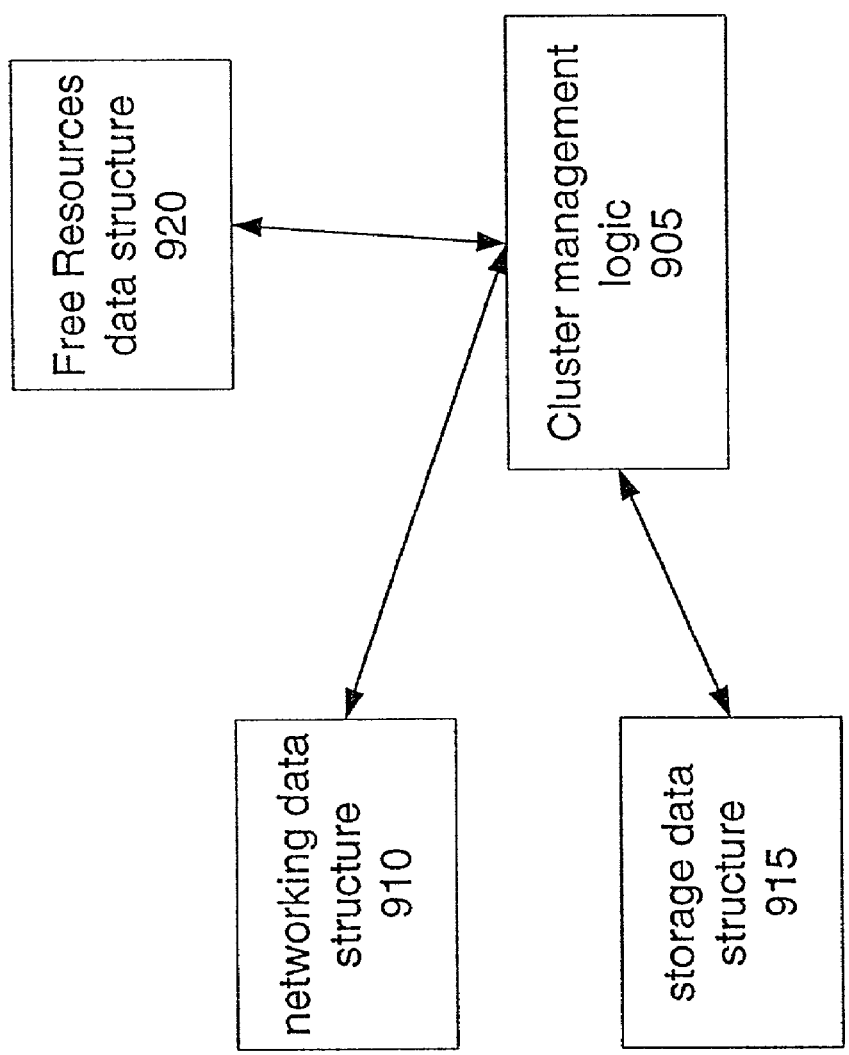
FIG. 9 illustrates the cluster management logic of certain embodiments of the invention.

FIG. 9 illustrates the cluster management logic of certain embodiments. The cluster management logic 905 accesses the data structures 910 that record the networking information described above, such as the network topologies of PANs, the MAC address assignments within a PAN and so on. In addition, the cluster management logic 905 accesses the data structures 915 that record the storage correspondence of the various processors 106. Moreover, the cluster management logic 905 accesses a data structure 920 that records free resources such as unallocated processors within the platform 100.

In response to processor error events or administrator commands, the cluster management logic 905 can change the data structures to cause the storage and networking personalities of a given processor to "migrate" to a new processor. In this fashion, the new processor "inherits" the personality of the former processor. The cluster management logic 905 may be caused to do this to swap a new processor in to a PAN to replace a failing one.

The new processor will inherit the MAC address of a former processor and act like the former. The control node will communicate the connectivity information when the new processor boots, and will update the connectivity information for the non-failing processors as needed. For example, in certain embodiments, the RVI connections for the other processors are updated transparently; that is, the software on the other processors does not need to be involved in establishing connectivity to the newly swapped in processor. Moreover, the new processor will inherit the storage correspondence of the former and consequently inherit the persisted state of the former processor.

Among other advantages this allows a free pool of resources, including processors, to be shared across the entire platform rather than across given PANs. In this way, the free resources (which may be kept as such to improve reliability and fault tolerance of the system) may be used more efficiently.

When a new processor is "swapped in" it will need to re-ARP to learn IP address to MAC address associations.

Alternatives

As each Giganet port of the switch fabric 115 can support 1024 simultaneous Virtual Interface connections over it and keep them separate from each other with hardware protection, the operating system can safely share a node's Giganet ports with application programs. This would allow direct connection between application programs without the need to run through the full stack of driver code. To do this, an operating system call would establish a Virtual Interface channel and memory-map its buffers and queues into application address space. In addition, a library to encapsulate the low-level details of interfacing to the channel would facilitate use of such Virtual Interface connections. The library could also automatically establish redundant Virtual Interface channel pairs and manage sharing or failing over between them, without requiring any effort or awareness from the calling application.

The embodiments described above emulated Ethernet internally over an ATM-like fabric. The design may be changed to use an internal Ethernet fabric which would simplify much of the architecture, e.g., obviating the need for emulation features. If the external network communicates according to ATM, another variation would use ATM internally without emulation of Ethernet and the ATM could be communicated externally to the external network when so addressed. Another variation would allow ATM internally to the platform (i.e., without emulation of Ethernet) and only external communications are transformed to Ethernet. This would streamline internal communications but require emulation logic at the controller.

Certain embodiments deploy PANs based on software configuration commands. It will be appreciated that deployment may be based on programmatic control. For example, more processors may be deployed under software control during peak hours of operation for that PAN, or corresponding more or less storage space for a PAN may be deployed under software algorithmic control.

It will be appreciated that the scope of the present invention is not limited to the above described embodiments, but rather is defined by the appended claims; and that these claims will encompass modifications of and improvements to what has been described.

What is claimed is:

1. A platform for computer processing, connectable to an external communication network and a storage network and comprising:
    a plurality of computer processors connected to an internal communication network;
    configuration logic to define and establish (a) a virtual local area communication network over the internal network, wherein each computer processor in the virtual local area communication network has a corresponding virtual MAC address and the virtual local area network provides communication among a set of computer processors but excludes the processors from the plurality not in the defined set, and (b) a virtual storage space with a defined correspondence to the address space of the storage network; and
    failover logic, responsive to a failure of a computer processor, to allocate a computer processor from the plurality to replace the failed processor, the failover logic including logic to assign the virtual MAC address of the failed processor to the processor that replaces the failed processor, logic to assign the virtual storage space and defined correspondence of the failed processor to the processor that replaces the failed processor, and logic to reestablish the virtual local area network to include the processor that replaces the failed processor and to exclude the failed processor.

2. The platform of claim 1 wherein the configuration logic establishes virtual interfaces to define software communication paths among processors of the virtual network and wherein the failover logic includes logic to establish virtual interfaces from the processors in the virtual network to the processor that replaces the failed processor.

3. The platform of claim 1 wherein the configuration logic establishes a second virtual local area network from a second set of computer processors and a second virtual storage space with a defined correspondence to the storage network address space and wherein the failover logic causes the processor replacing the failed processor to inherit the virtual local area network and the virtual storage personality of the failed processor.

4. A method of computer processing in a platform having a plurality of computer processors connected to an internal communication network, comprising:
    defining and establishing a virtual local area communication network over the internal network, in which each computer processor in the virtual local area communication network has a corresponding virtual MAC address and the virtual local area network provides communication among a set of computer processors but excludes the processors from the plurality not in the defined set;
    defining and establishing a virtual storage space with a defined correspondence to the address space of the storage network; and
    in response to a failure by a computer processor, allocating a computer processor from the plurality to replace the failed processor, including assigning the MAC address of the failed processor to the processor that replaces the failed processor, assigning the virtual storage space and defined correspondence of the failed processor to the processor that replaces the failed processor, and reestablishing the virtual local area network to include the processor that replaces the failed processor and to exclude the failed processor.

5. The method of claim 4 wherein when establishing a virtual local area network virtual interfaces are established to define software communication paths among processors of the virtual network and when a processor replaces a failed processor virtual interfaces are established to the processor replacing the failed processor.

6. The method of claim 4 wherein a second virtual local area network is established with a second set of computer processors and a second virtual storage space with a defined correspondence to the storage network address space and when a processor fails the processor replacing the failed processor inherits the virtual local area network and the virtual storage personality of the failed processor.

* * * * *